US009553697B2

(12) United States Patent
Chen et al.

(10) Patent No.: US 9,553,697 B2
(45) Date of Patent: Jan. 24, 2017

(54) HARQ ACK/NACK TRANSMISSION FOR MULTI-CARRIER OPERATION

(75) Inventors: Wanshi Chen, San Diego, CA (US); Jelena M. Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 13/078,765

(22) Filed: Apr. 1, 2011

(65) Prior Publication Data

US 2012/0082145 A1 Apr. 5, 2012

Related U.S. Application Data

(60) Provisional application No. 61/321,067, filed on Apr. 5, 2010.

(51) Int. Cl.
*H04L 1/18* (2006.01)
*H04L 1/00* (2006.01)
(Continued)

(52) U.S. Cl.
CPC ........... *H04L 1/1861* (2013.01); *H04L 1/0029* (2013.01); *H04L 1/1607* (2013.01); *H04L 5/0055* (2013.01)

(58) Field of Classification Search
CPC .............................. H04L 5/0053; H04L 5/0055
(Continued)

(56) References Cited

U.S. PATENT DOCUMENTS

2006/0067416 A1* 3/2006 Tirkkonen et al. ........... 375/260
2009/0213769 A1* 8/2009 Shen et al. ................... 370/280
(Continued)

FOREIGN PATENT DOCUMENTS

CN 101478379 A 7/2009
WO WO 2008042904 A2 * 4/2008 ............... H04L 1/16
(Continued)

OTHER PUBLICATIONS

CATT, UL ACK/NACK Transmission Design in FDD with CA, 3GPP TSG RAN WG1 Meeting #60, R1-100876, San Francisco, CA, Feb. 22-26, 2010, pp. 1-5.*
(Continued)

*Primary Examiner* — Benjamin Lamont

(57) ABSTRACT

Techniques for sending ACK/NACK information in a multi-carrier wireless communication network are disclosed. In one aspect, a plurality of ACK/NACK transmission techniques are selectively employed by a multi-carrier user equipment (UE) to reduce the number of bits of ACK/NACK information to send and/or increase the number of payload bits available for sending the ACK/NACK information. The ACK/NACK transmission techniques may include an orthogonal sequence reduction technique, a channel selection technique, a spatial bundling technique, a carrier bundling technique, and/or a subframe bundling technique. The ACK/NACK transmission techniques may be prioritized based on the number of carriers on which data transmissions are received, a payload size available for carrying ACK/NACK information, and/or other factors. The multi-carrier UE can utilize different ACK/NACK transmission techniques in connection with different subsets of its configured carriers.

44 Claims, 10 Drawing Sheets

(51) Int. Cl.
*H04L 1/16* (2006.01)
*H04L 5/00* (2006.01)

(58) Field of Classification Search
USPC ........................................................ 370/329
See application file for complete search history.

(56) References Cited

U.S. PATENT DOCUMENTS

| | | | |
|---|---|---|---|
| 2009/0241004 A1* | 9/2009 | Ahn et al. ..................... | 714/749 |
| 2009/0279460 A1 | 11/2009 | Sarkar | |
| 2010/0150081 A1* | 6/2010 | Gao ....................... | H04L 1/1621 370/329 |
| 2010/0210256 A1* | 8/2010 | Shen et al. ................. | 455/422.1 |
| 2010/0271970 A1* | 10/2010 | Pan et al. ...................... | 370/252 |
| 2010/0272048 A1* | 10/2010 | Pan et al. ...................... | 370/329 |
| 2011/0002276 A1* | 1/2011 | Chen ................ | H04W 72/0413 370/329 |
| 2011/0013536 A1* | 1/2011 | Falahati et al. ............... | 370/252 |
| 2011/0090825 A1* | 4/2011 | Papasakellariou et al. .. | 370/280 |
| 2011/0128942 A1* | 6/2011 | Kim .................... | H04B 7/0632 370/336 |
| 2011/0243066 A1* | 10/2011 | Nayeb Nazar .......... | H04L 1/007 370/328 |
| 2011/0310856 A1* | 12/2011 | Hariharan ............. | H04L 1/1607 370/336 |
| 2012/0087254 A1* | 4/2012 | Yin ....................... | H04L 1/0031 370/252 |
| 2012/0088533 A1* | 4/2012 | Khoshnevis .......... | H04L 1/0026 455/509 |
| 2012/0093097 A1* | 4/2012 | Che ........................ | H04L 5/001 370/329 |
| 2012/0106569 A1* | 5/2012 | Che ....................... | H04L 1/1671 370/437 |
| 2012/0300733 A1* | 11/2012 | Pelletier et al. ............. | 370/329 |
| 2013/0176920 A1* | 7/2013 | Seo ....................... | H04L 1/1861 370/280 |

FOREIGN PATENT DOCUMENTS

| | | | |
|---|---|---|---|
| WO | WO2009118621 A2 | 10/2009 | |
| WO | WO 2009/137646 | * 11/2009 | ............... H04L 1/16 |

OTHER PUBLICATIONS

Samsung, Discussion on ACK/NACK bundling method for LTE-A TDD, R1-104579, 3GPP TSG RAN WG1 meeting #62, Agenda Item 6.2.2.1, Madrid, Spain, Aug. 23-28, 2010, pp. 1-6.*
Nokia, UL ACK/NACK Feedback in LTE-A TDD, R1-101419, 3GPP TSG RAN WG1 Meeting #60, Agenda Item 7.1.4, San Fransicso, US, Feb. 22-26, 2010, p. 1-4.*
International Search Report and Written Opinion—PCT/US2011/031309, International Search Authority—European Patent Office—Aug. 30, 2011.
Written Opinion—PCT/US2011/031309—ISA/EPO—Oct. 18, 2010.
Taiwan Search Report—TW100111867—TIPO—Oct. 1, 2013.

* cited by examiner

HARQ ACK/NACK TRANSMISSION FOR MULTI-CARRIER OPERATION

The present application claims priority to provisional U.S. application Ser. No. 61/321,067, entitled "HARQ ACK/NACK TRANSMISSION ON PUCCH FOR LTE-A MULTI-CARRIER OPERATION," filed Apr. 5, 2010, assigned to the assignee hereof and incorporated herein by reference.

BACKGROUND

I. Field

The present disclosure relates generally to communication, and more specifically to techniques for sending acknowledgement/negative acknowledgement (ACK/NACK) feedback for data transmissions in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc. A base station may send data transmissions on multiple carriers on the downlink to a UE. The UE may receive and decode the data transmissions, determine whether each data transmission is decoded correctly or in error, and send ACK/NACK information on the uplink for the data transmissions received on the downlink.

SUMMARY

Techniques for sending ACK/NACK information in a multi-carrier wireless communication network are disclosed. In one aspect, a plurality of ACK/NACK transmission techniques may be utilized by a multi-carrier UE to variously reduce the number of bits of ACK/NACK information to send and/or increase the number of payload bits available for sending the ACK/NACK information. The ACK/NACK transmission techniques may include an orthogonal sequence reduction technique, a channel selection technique, a spatial bundling technique, a carrier bundling technique, a subframe bundling technique, etc. The ACK/NACK transmission techniques may be prioritized based on the number of carriers on which data transmissions are received, a payload size available for carrying ACK/NACK information, and other factors. The multi-carrier UE may utilize different ACK/NACK transmission techniques in connection with different subsets of its configured carriers.

In one design, a UE may determine that it is configured for multi-carrier operation on a set of carriers. The UE may receive data transmissions on a plurality of carriers in the set of carriers. The UE may determine ACK/NACK bits for the data transmissions on the plurality of carriers. The UE may determine at least one ACK/NACK transmission technique to use for sending ACK/NACK information. The at least one ACK/NACK transmission technique may be selected from among a plurality of supported ACK/NACK transmission techniques. The UE may send ACK/NACK bits for the data transmissions on the plurality of carriers based on the at least one ACK/NACK transmission technique.

The at least one ACK/NACK transmission technique selected for use may include one or more of the following: (i) an orthogonal sequence reduction technique for sending ACK/NACK bits using an orthogonal sequence of a shorter length than a nominal length, (ii) a channel selection technique for sending ACK/NACK information using one of multiple resources, (iii) a spatial bundling technique for bundling ACK/NACK bits for packets sent concurrently on a carrier with spatial multiplexing, (iv) a carrier bundling technique for bundling ACK/NACK bits for packets sent on multiple carriers in a subframe, (v) a subframe bundling technique for bundling ACK/NACK bits for packets sent on a carrier in multiple subframes, and/or (vi) other ACK/NACK transmission techniques.

The at least one ACK/NACK transmission technique may be selected based on one or more criteria, which may include (i) the number of carriers on which data transmissions are received, (ii) the total number of ACK/NACK bits for the data transmissions on the plurality of carriers, (iii) a data transmission format for each of the plurality of carriers (e.g., spatial multiplexing or no spatial multiplexing), (iv) a ratio of downlink subframes to uplink subframes, (v) the priorities of the plurality of supported ACK/NACK transmission techniques, and/or (vi) other criteria.

In another aspect, carrier bundling may be performed for a subset of all downlink carriers used to send data transmissions. In one design, a UE may determine that it is configured for multi-carrier operation on a set of carriers. The UE may receive data transmissions on a plurality of carriers in the set of carriers. The UE may determine ACK/NACK bits for the data transmissions on the plurality of carriers. The UE may also determine at least two carriers for which to bundle ACK/NACK bits. The at least two carriers may be a subset of the plurality of carriers. The UE may bundle the ACK/NACK bits, across carriers, for the data transmissions on the at least two carriers. The UE may send ACK/NACK information comprising at least one bundled ACK/NACK bit for the data transmissions on the at least two carriers.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
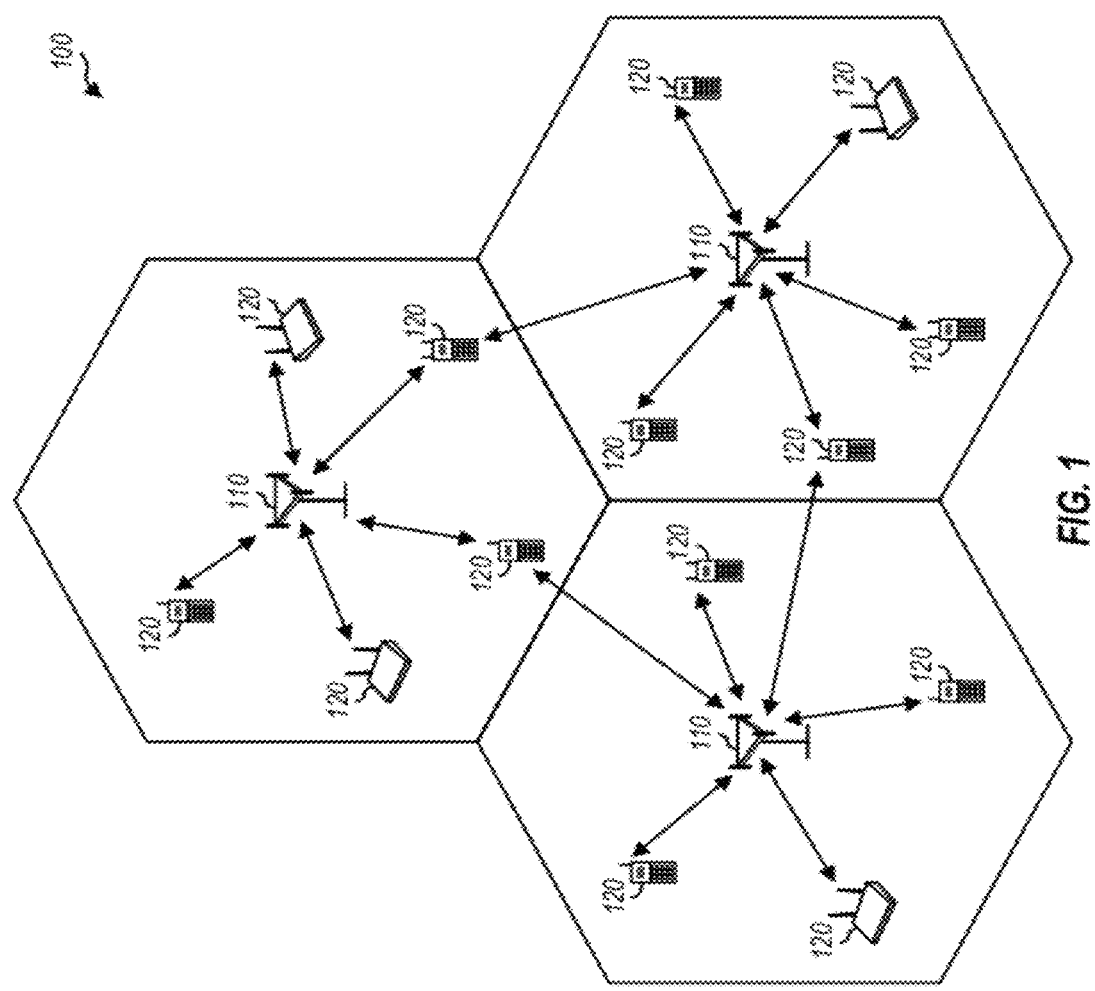
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. In general, an eNB may support one or multiple (e.g., three) cells. The term "cell" may also refer to a carrier on which an eNB operates.

UEs may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

Wireless network 100 may support multi-carrier operation with multiple carriers on the downlink and one or more carriers on the uplink. A carrier used for the downlink may be referred to as a downlink (DL) carrier, and a carrier used for the uplink may be referred to as an uplink (UL) carrier. An eNB may transmit data on one or more downlink carriers to a UE. The UE may send feedback information on one or more uplink carriers to the eNB.

Wireless network 100 may utilize frequency division duplexing (FDD) or time division duplexing (TDD). For FDD, the downlink and uplink may be allocated separate carriers (or frequency channels). Downlink transmissions may be sent on one or more downlink carriers, and uplink transmissions may be sent on one or more uplink carriers. For TDD, the downlink and uplink may share the same one or more carriers, and each carrier may be used for both the downlink and uplink. Downlink and uplink transmissions may be sent on the same carrier(s) in different time periods in TDD.

Wireless network 100 may support transmission of data with hybrid automatic retransmission (HARQ) in order to improve reliability. For HARQ, a transmitter may send an initial transmission of a packet of data and may send one or more additional transmissions of the packet, if needed, until the packet is decoded correctly by a receiver, or the maximum number of transmissions of the packet has occurred, or some other termination condition is encountered. After each transmission of the packet, the receiver may decode all received transmissions of the packet to attempt to recover the packet. The receiver may send an ACK if the packet is decoded correctly or a NACK if the packet is decoded in error. The transmitter may send another transmission of the packet if a NACK is received and may terminate transmission of the packet if an ACK is received. The transmitter may process (e.g., encode and modulate) the packet based on a modulation and coding scheme (MCS), which may be selected such that the packet can be decoded correctly with high probability after a target number of transmissions of the packet. This target number of transmissions may be referred to as a target termination. A packet may also be referred to as a transport block, a codeword, a data block, etc. A data transmission may refer to a transmission of one or more packets.

Figure 2:
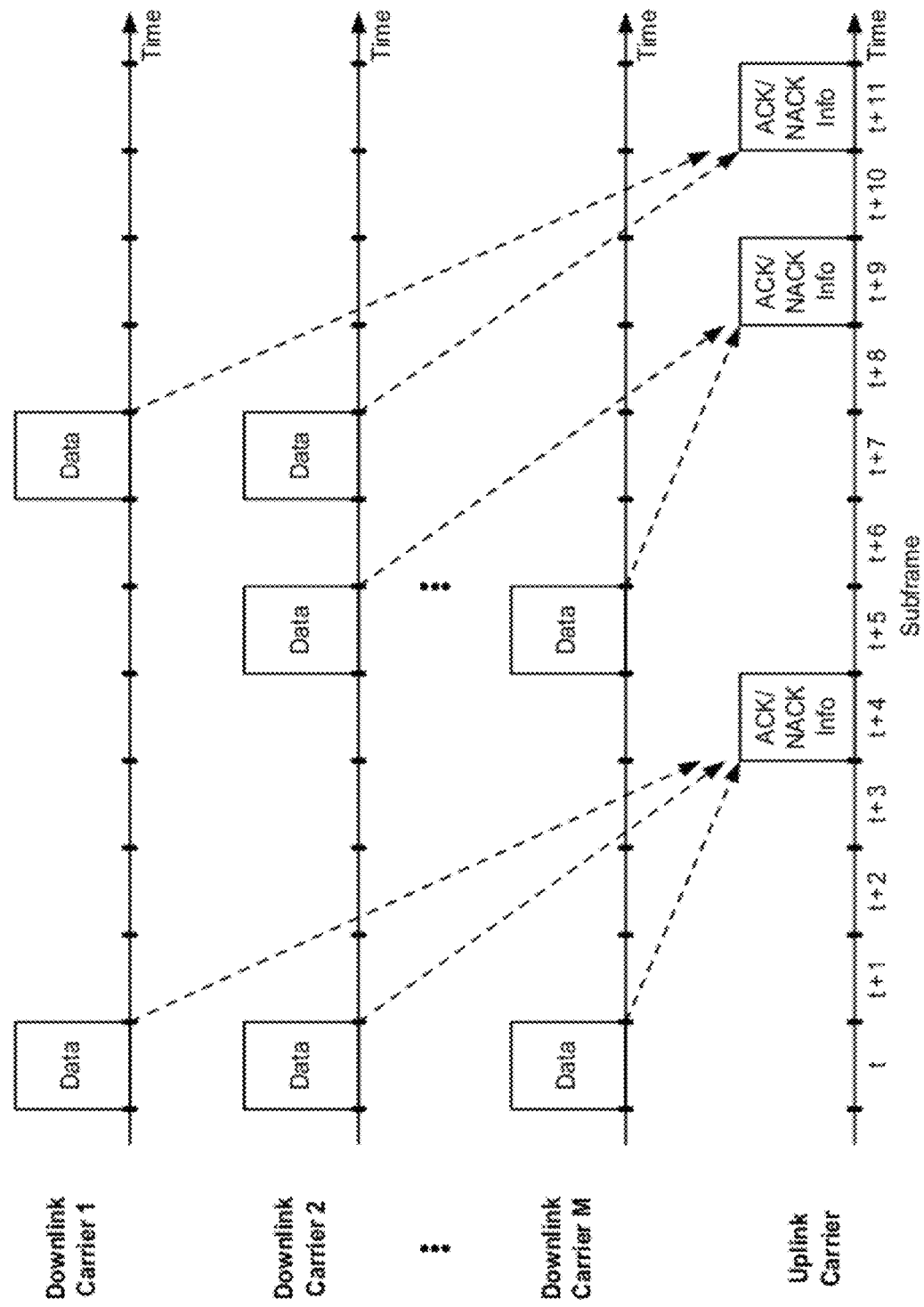
FIGS. 2 and 3 show transmission of data on multiple downlink carriers in frequency division duplexing (FDD) and time division duplexing (TDD), respectively.

FIG. 2 shows a scheme for transmitting data on multiple downlink carriers in FDD with HARQ. The transmission timeline for each of the downlink and uplink may be partitioned into units of subframes. Each subframe may have a predetermined duration, e.g., one millisecond (ms).

A UE may periodically estimate the downlink channel quality of different downlink carriers for an eNB and may send channel quality indicator (CQI) information to the eNB (not shown in FIG. 2). The eNB may use the CQI information and/or other information to select the UE for transmission of data on the downlink, to schedule the UE on one or more selected downlink carriers, and to select one or more MCSs for the UE for each selected downlink carrier. The eNB may process (e.g., encode and modulate) one or more packets for each selected downlink carrier based on the one or more MCSs selected for that downlink carrier. The eNB may then send a data transmission of one or more packets on each selected downlink carrier to the UE.

The UE may receive and decode the data transmission of one or more packets on each selected downlink carrier. The UE may determine whether each packet on each selected downlink carrier is decoded correctly or in error. The UE may obtain an ACK/NACK bit for each packet, and the ACK/NACK bit may be set (i) to a first value (e.g., '1') to indicate an ACK if the packet is decoded correctly or (ii) to a second value (e.g., '0') to indicate a NACK if the packet is decoded in error. The UE may send ACK/NACK information comprising the ACK/NACK bits for all packets. The ACK/NACK information may also be referred to as ACK/NACK feedback, HARQ feedback, etc. The eNB may receive the ACK/NACK information from the UE, terminate transmission of each packet for which an ACK is received, and send another data transmission for each packet for which a NACK is received.

As shown in FIG. 2, the UE may receive data transmissions on any number of downlink carriers in each subframe. Furthermore, the UE may receive a data transmission of one or more packets on each downlink carrier selected for use. In one design, the UE may send ACK/NACK information for all packets received on all downlink carriers in a given subframe in one ACK/NACK transmission on one uplink carrier, as shown in FIG. 2.

Figure 3:
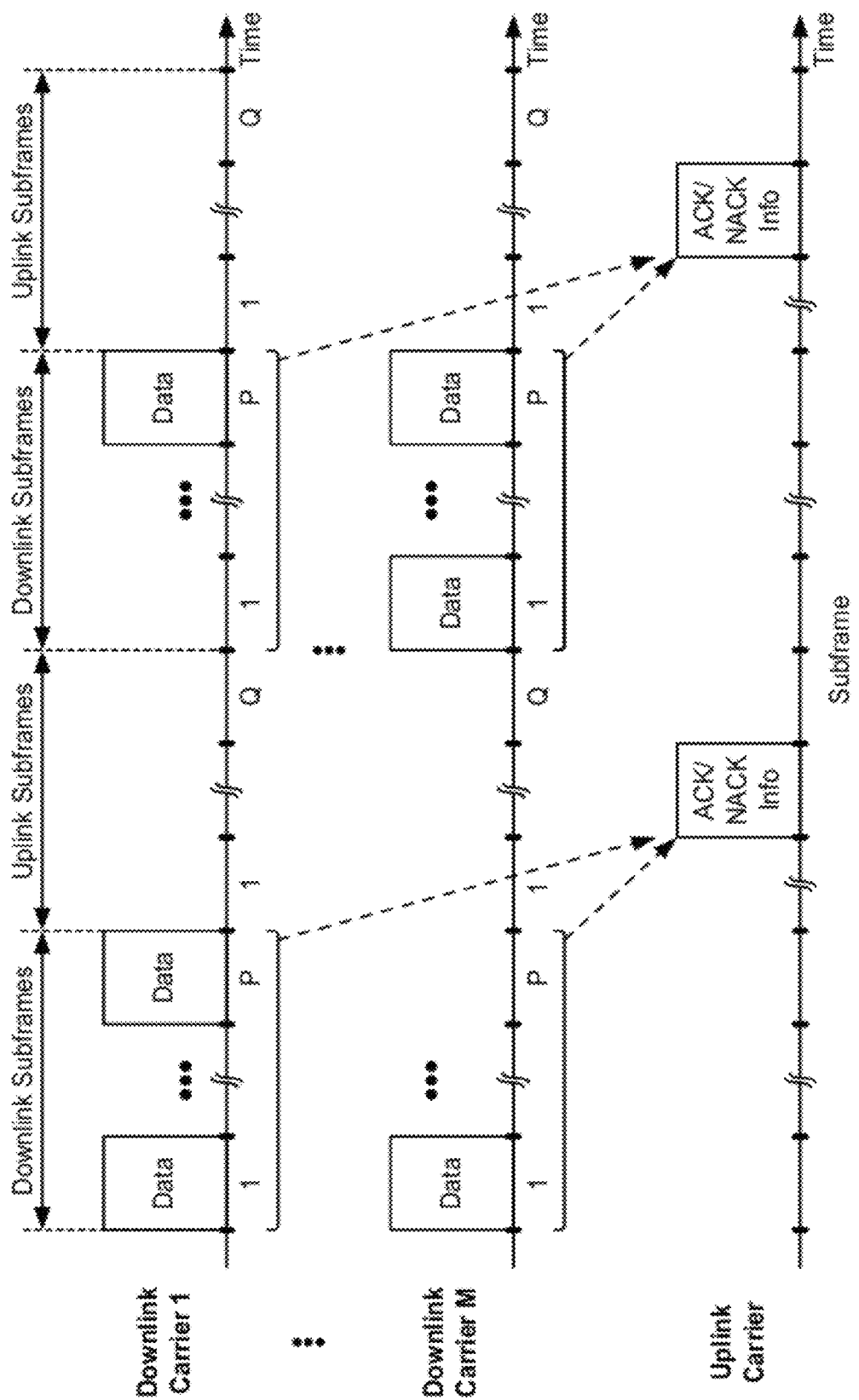

FIG. 3 shows a scheme for transmitting data on multiple downlink carriers in TDD with HARQ. For TDD, some of the subframes in each radio frame may be used for the downlink and may be referred to as downlink subframes. The remaining subframes in each radio frame may be used for the uplink and may be referred to as uplink subframes. For simplicity, FIG. 3 shows P consecutive downlink subframes followed by Q consecutive uplink subframes, where P≥1, Q≥1, and P+Q=10 for TDD in LTE. In general, the downlink subframes may or may not be contiguous and may or may not be mixed with the uplink subframes.

A UE may periodically estimate the downlink channel quality of different downlink carriers for an eNB and may send CQI information to the eNB (not shown in FIG. 3). The eNB may use the CQI information and/or other information to select the UE for transmission of data on the downlink, to schedule the UE on one or more selected downlink carriers and in one or more downlink subframes on each selected downlink carrier, and to select one or more MCSs for the UE for each selected downlink carrier. In each downlink subframe in which the UE is scheduled, the eNB may process (e.g., encode and modulate) one or more packets for each selected downlink carrier based on the one or more MCSs selected for that downlink carrier. The eNB may then send a data transmission of one or more packets on each selected downlink carrier to the UE.

The UE may receive and decode the data transmission of one or more packets on each selected downlink carrier in each downlink subframe in which the UE is scheduled. The UE may determine whether each packet on each selected downlink carrier is decoded correctly or in error and may obtain an ACK/NACK bit for each packet. The UE may send ACK/NACK information comprising the ACK/NACK bits for all packets received on all downlink carriers in all downlink subframes. The eNB may receive the ACK/NACK information from the UE and may send another data transmission for each packet for which a NACK is received.

As shown in FIG. 3, the UE may receive data transmissions on any number of downlink carriers in each downlink subframe. Furthermore, the UE may receive a data transmission of one or more packets on each downlink carrier in each downlink subframe in which the UE is scheduled. In one design, the UE may send ACK/NACK information for all packets received on all downlink carriers in all downlink subframes in a particular time interval (e.g., a radio frame) in one ACK/NACK transmission on one uplink carrier in one uplink subframe, as shown in FIG. 3.

LTE networks utilize orthogonal frequency division multiplexing (OFDM) on the downlink and single-carrier frequency division multiplexing (SC-FDM) on the uplink. OFDM and SC-FDM partition a frequency range for a carrier into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the carrier bandwidth. For example, $N_{FFT}$ may be equal to 128, 256, 512, 1024 or 2048 for a carrier bandwidth of 1.25, 2.5, 5, 10 or 20 MHz, respectively.

Each subframe may be partitioned into two slots. Each slot may include six symbol periods for an extended cyclic prefix or seven symbol periods for a normal cyclic prefix. The available time-frequency resources for each carrier may be partitioned into resource blocks. Each resource block may cover 12 subcarriers in one slot. The number of resource blocks in each slot may be dependent on the carrier bandwidth and may range from 6 to 110.

Figure 4:
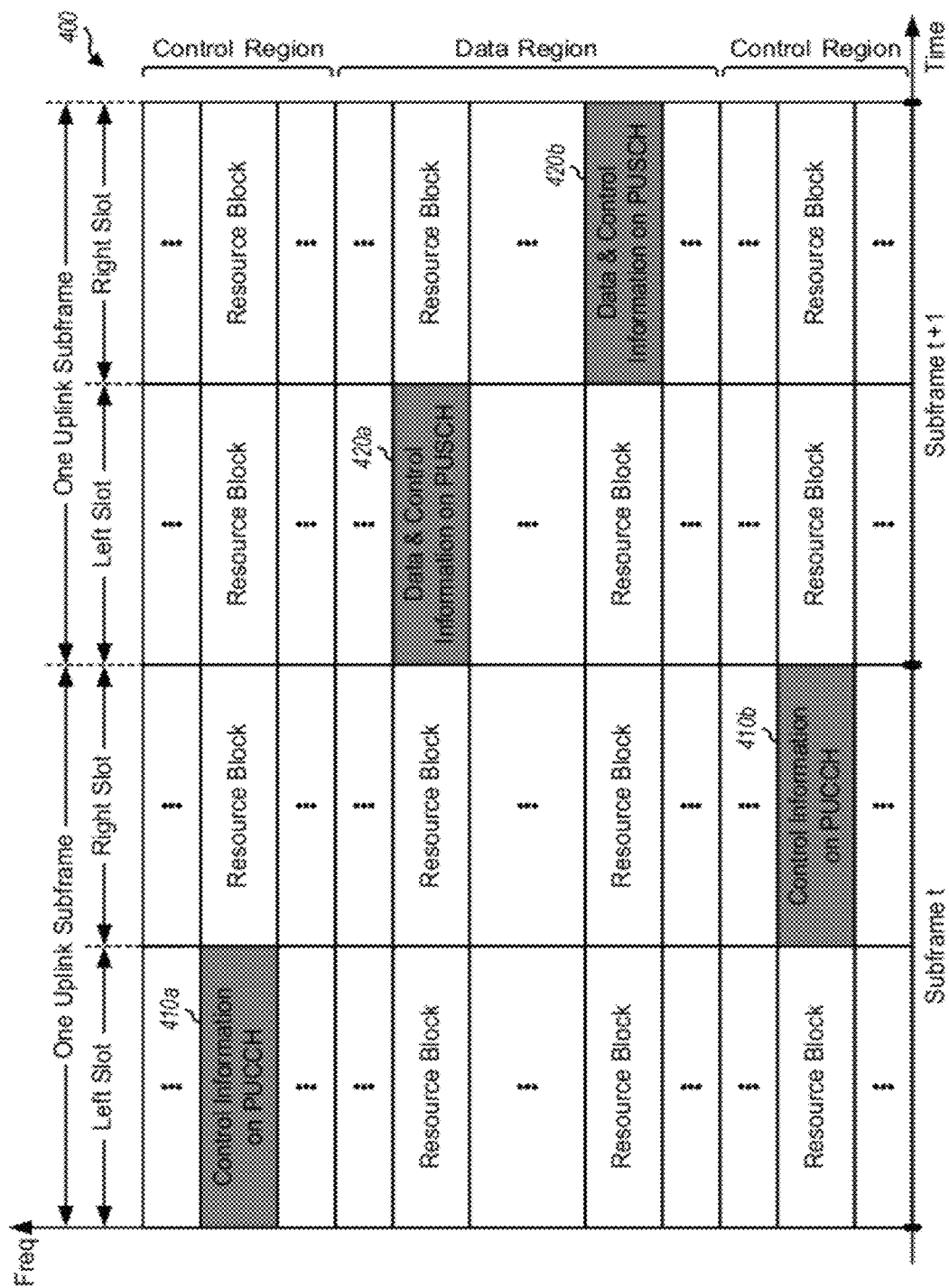
FIG. 4 shows an exemplary transmission structure for the uplink.

FIG. 4 shows an exemplary transmission structure for the uplink in LTE. On the uplink, the available resource blocks for one uplink carrier may be partitioned into a data section and a control section. The control section may be formed at the two edges of the carrier bandwidth (as shown in FIG. 4) and may have a configurable size. The data section may include all resource blocks not included in the control section. A UE may be assigned two resource blocks 410$a$ and 410$b$ (or possibly more than two resource blocks) in the control region in two slots of one subframe to send control information on a Physical Uplink Control Channel (PUCCH). The two resource blocks may occupy different sets of subcarriers when frequency hopping is enabled, as shown in FIG. 4. The UE may be assigned two resource blocks 420$a$ and 420$b$ (or possibly more than two resource blocks) in the data region in two slots of one subframe to send only data or both data and control information on a Physical Uplink Shared Channel (PUSCH).

Figure 5:
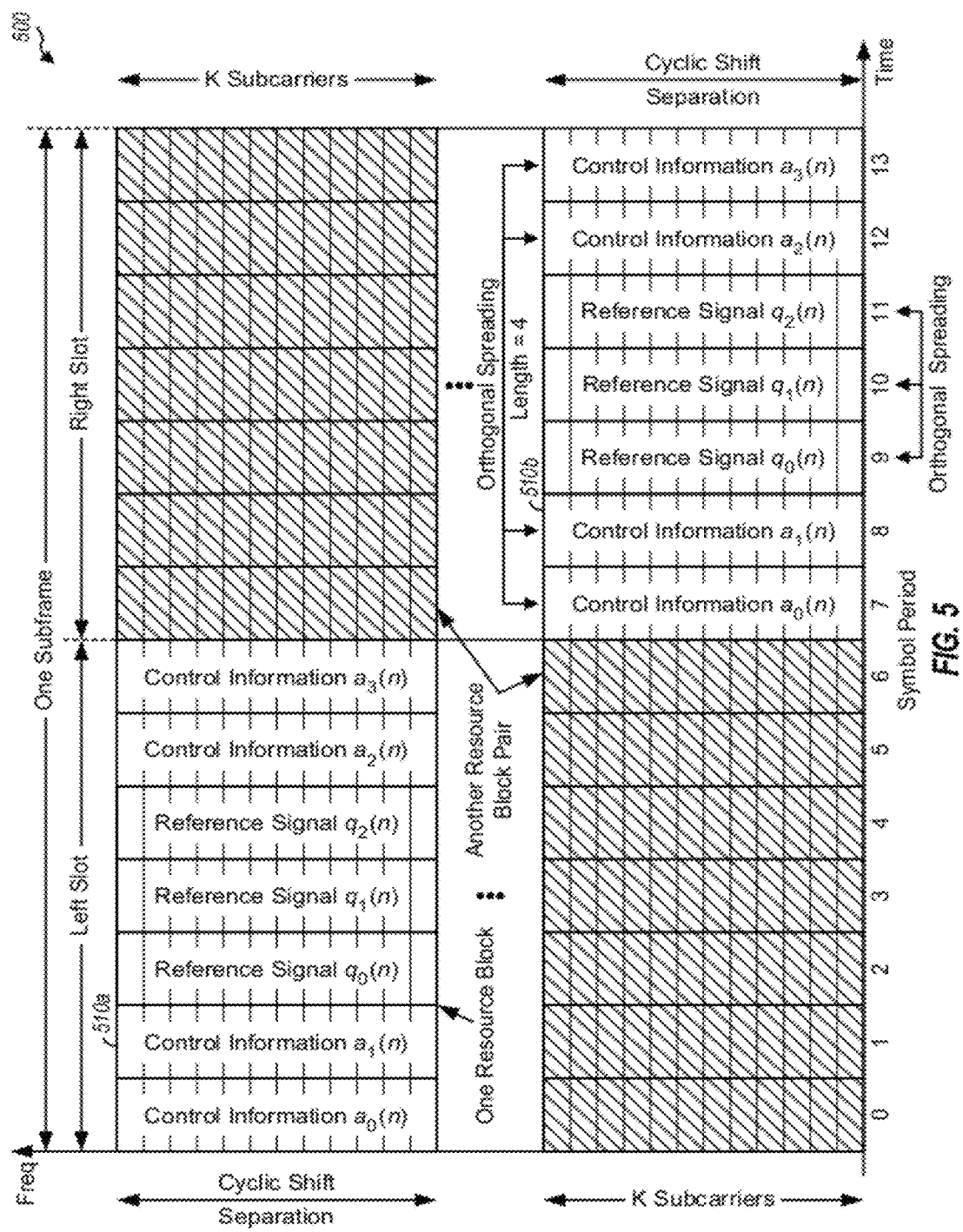
FIG. 5 shows an exemplary transmission of ACK/NACK information.

FIG. 5 shows a scheme for sending ACK/NACK information on the PUCCH in LTE Release 8 for a case in which each slot includes seven symbol periods. The PUCCH may be sent on two resource blocks 510$a$ and 510$b$ in two slots of one subframe. Each resource block 510 includes four symbol periods for ACK/NACK information and three symbol periods for a reference signal. In the left slot, ACK/NACK information may be sent in symbol periods 0, 1, 5 and 6, and a reference signal may be sent in symbol periods 2, 3 and 4. In the right slot, ACK/NACK information may be sent in symbol periods 7, 8, 12 and 13, and a reference signal may be sent in symbol periods 9, 10 and 11. ACK/NACK information and reference signals may also be sent in other manners on a pair of resource blocks.

A UE may process ACK/NACK information as follows. The UE may map one or two bits of ACK/NACK information to a modulation symbol d(0) based on BPSK or QPSK. The UE may then modulate and spread a reference signal sequence with the modulation symbol, as follows:

$$a_n(k) = w(n) \cdot d(0) \cdot r(k), \text{ for } k=0, \ldots, K-1 \text{ and}$$
$$n=0, \ldots, N-1, \qquad \text{Eq (1)}$$

where
r(k) is a reference signal sequence,
w(n) is an orthogonal sequence used to spread ACK/NACK information,
$a_n(k)$ is the n-th data sequence for ACK/NACK information,
K is the number of subcarriers in one resource block, and
N is the length of the orthogonal sequence.

As shown in equation (1), the reference signal sequence r(k) may be modulated with modulation symbol d(0) to obtain a modulated sequence d(0)·r(k). The modulated sequence may then be spread with orthogonal sequence w(n) to obtain N data sequences, where N=4 in FIG. 5. The N data sequences may be sent in N symbol periods in each of the two resource blocks 510a and 510b, e.g., as shown in FIG. 5.

A number of reference signal sequences may be defined based on different cyclic shifts of a base sequence. The base sequence may be a Zadoff-Chu sequence, a computer generated sequence, etc. Up to K different reference signal sequences may be obtained with up to K different cyclic shifts of the base sequence of length K.

For the normal cyclic prefix, each slot includes seven symbol periods, and four symbol periods in each slot may be used to send ACK/NACK information, as shown in FIG. 5. In this case, an orthogonal sequence of length four may be used to spread ACK/NACK information across symbol periods in the time domain. For the extended cyclic prefix, each slot includes six symbol periods, and three symbol periods in each slot may be used to send ACK/NACK information. In this case, an orthogonal sequence of length three may be used for spreading across time.

The scheme shown in FIG. 5 may be used to send a limited number of bits (e.g., up to two bits) of ACK/NACK information. Hence, the scheme shown in FIG. 5 may be used for single-carrier operation with one or two packets being sent on one downlink carrier.

In general, a UE may be configured with any number of downlink carriers and any number of uplink carriers for multi-carrier operation. In one design, for each of the downlink and uplink, one carrier may be designated as a primary carrier, and the remaining carriers (if any) may be designated as secondary carriers. The primary carrier for each link may be semi-statically configured by upper layer (e.g., Layer 3) signaling or determined in other manners. The primary carrier for each link may be used to send certain control information/signaling for that link. For example, the UE may send ACK/NACK information on the PUCCH on the primary carrier for the uplink (or primary uplink carrier). The UE may also send CQI information, scheduling request, and/or other information on the PUCCH on the primary uplink carrier.

With multi-carrier operation, a UE may need to send more than two bits of ACK/NACK information. As one example, with multi-carrier operation in FDD, multiple downlink carriers may be mapped to a single uplink carrier, one or multiple packets may be transmitted on each downlink carrier, and ACK/NACK information for all packets transmitted on the multiple downlink carriers may be sent on the PUCCH on one uplink carrier (e.g., the primary uplink carrier). In one scenario, up to five downlink carriers may be mapped to a single uplink carrier, and up to two packets may be transmitted on each downlink carrier. In this case, up to 10 ACK/NACK bits may be obtained for up to 10 packets and may need to be sent on the PUCCH on one uplink carrier.

For multi-carrier operation in TDD, multiple downlink carriers may be mapped to a single uplink carrier, multiple downlink subframes may be associated with a single uplink subframe, up to two packets may be transmitted on each downlink carrier in each downlink subframe, and ACK/NACK information for all packets transmitted on the multiple downlink carriers in the multiple downlink subframes may be sent on the PUCCH on one uplink carrier in one uplink subframe. In one scenario, up to five downlink carriers may be mapped to a single uplink carrier, up to nine downlink subframes may be associated with a single uplink subframe, and up to two packets may be transmitted on each downlink carrier in each downlink subframe. In this case, up to 90 ACK/NACK bits may be obtained for up to 90 packets and may need to be sent on the PUCCH on one uplink carrier in one uplink subframe.

According to one aspect of the present disclosure, a number of ACK/NACK transmission techniques may be supported, and a multi-carrier UE may utilize one or more ACK/NACK transmission techniques to send ACK/NACK information. In one design, the multi-carrier UE may select one or more of the following ACK/NACK transmission techniques to reduce the number of bits of ACK/NACK information to send and/or to increase the number of payload bits that can be used to send ACK/NACK information:

Orthogonal sequence reduction—send ACK/NACK information using an orthogonal sequence of a shorter length than a nominal length, Channel selection—send ACK/NACK information using one of multiple resources, Spatial bundling—bundle ACK/NACK bits for multiple packets sent with spatial multiplexing on one downlink subcarrier in one downlink subframe, Carrier bundling—bundle ACK/NACK bits for packets sent on multiple downlink carriers in one downlink subframe, and Subframe bundling—bundle ACK/NACK bits for packets sent on one downlink carrier in multiple downlink subframes.

The orthogonal sequence reduction technique may be used to increase the number of payload bits on the PUCCH, i.e., increase the PUCCH payload size. For the normal cyclic prefix, up to two bits of ACK/NACK information may be sent with an orthogonal sequence of length four (which is the nominal length for the normal cyclic prefix), up to four bits may be sent with an orthogonal sequence of length two, and up to eight bits may be sent with an orthogonal sequence of length one (which corresponds to no orthogonal spreading). For the extended cyclic prefix, up to two bits of ACK/NACK information may be sent with an orthogonal sequence of length three (which is the nominal length for the extended cyclic prefix), and up to six bits may be sent with an orthogonal sequence of length one (i.e., without orthogonal spreading).

The channel selection technique may also be used to increase the number of payload bits on the PUCCH. A UE may be assigned multiple ACK/NACK resources for sending ACK/NACK information. Each ACK/NACK resource may correspond to a channel and may comprise a particular reference signal sequence (e.g., a specific cyclic shift of the base sequence), a particular orthogonal sequence, and a particular pair of resource blocks. The UE may send ACK/NACK information using one of the multiple ACK/NACK resources assigned to the UE. Additional bits may be sent based on which ACK/NACK resource is selected for use. For example, the UE may be assigned four ACK/NACK resources and may select one of the four ACK/NACK resources for use. Two additional bits of ACK/NACK information may be conveyed by which one of the four ACK/NACK resources is selected by the UE. In general, B additional bits of ACK/NACK information may be sent by assigning the UE with $2^B$ ACK/NACK resources, where B may be equal to two or some other value.

The spatial bundling technique may be used to reduce the number of bits of ACK/NACK information to send. A UE may receive a data transmission of multiple packets with spatial multiplexing on one downlink carrier in one downlink subframe. The UE may determine whether each packet is decoded correctly or in error and may obtain an ACK/NACK bit for each packet. The UE may then bundle the ACK/NACK bits for all packets to obtain one bundled ACK/NACK bit. For example, the bundled ACK/NACK bit may be set (i) to a first value (e.g., '1') to convey a bundled ACK if ACKs are obtained for all packets or (ii) to a second value (e.g., '0') to convey a bundled NACK if a NACK is obtained for any packet. The UE may send one bundled ACK/NACK bit for all packets. An eNB may receive the bundled ACK/NACK bit from the UE. If the bundled ACK/NACK bit indicates a bundled ACK, then the eNB may know that ACKs have been obtained for all packets by the UE and may then terminate transmission of all packets. Conversely, if the bundled ACK/NACK indicates a bundled NACK, then the eNB may assume that NACKs have been obtained for all packets by the UE and may then send an additional transmission of the multiple packets.

The carrier bundling technique (which may also be referred to as a cross-carrier bundling technique) may also be used to reduce the number of bits of ACK/NACK information to send. A UE may receive multiple data transmissions for multiple packets on multiple downlink carriers in one downlink subframe. The UE may determine whether each packet is decoded correctly or in error and may obtain an ACK/NACK bit for each packet. The UE may then bundle the ACK/NACK bits for the multiple packets received on the multiple downlink carriers to obtain one bundled ACK/NACK bit. For example, the bundled ACK/NACK bit may convey (i) a bundled ACK if ACKs are obtained for all packets received on the multiple downlink carriers or (ii) a bundled NACK if a NACK is obtained for any packet received on any downlink carrier. The UE may then send one bundled ACK/NACK bit for the multiple packets received on the multiple downlink carriers. An eNB may receive the bundled ACK/NACK bit from the UE and may (i) terminate transmission of the multiple packets if a bundled ACK is received or (ii) send an additional transmission of the multiple packets on the multiple downlink carriers if a bundled NACK is received.

The subframe bundling technique may also be used to reduce the number of bits of ACK/NACK information to send. A UE may receive multiple data transmissions for multiple packets on one downlink carrier in multiple downlink subframes. The UE may determine whether each packet is decoded correctly or in error and may obtain an ACK/NACK bit for each packet. The UE may then bundle the ACK/NACK bits for the multiple packets received in the multiple downlink subframes to obtain one bundled ACK/NACK bit. For example, the bundled ACK/NACK bit may convey (i) a bundled ACK if ACKs are obtained for all packets received in the multiple downlink subframes or (ii) a bundled NACK if a NACK is obtained for any packet received in any downlink subframe. The UE may then send one bundled ACK/NACK bit for the multiple packets received in the multiple downlink subframes. An eNB may receive the bundled ACK/NACK bit from the UE and may (i) terminate transmission of the multiple packets if a bundled ACK is received or (ii) send an additional transmission of the multiple packets on one downlink carrier in multiple downlink subframes if a bundled NACK is received.

One or more ACK/NACK transmission techniques may be selected for use to send ACK/NACK information when a UE is operating in a multi-carrier mode. The UE may select the ACK/NACK transmission technique(s) in various manners. In one design, the UE may prioritize the supported ACK/NACK transmission techniques and may select them in an order determined based on their priorities. For example, the UE may select the orthogonal sequence reduction technique first, the spatial bundling technique second, the channel selection technique third, the subframe bundling technique fourth (if TDD is used), and the carrier bundling technique last. The ACK/NACK transmission techniques may also be selected in a different order. The ordering of the ACK/NACK transmission techniques may be predetermined (e.g., specified in a standard) and known a priori by both the UE and an eNB, or signaled by the eNB to the UE, or determined in other manners. The ordering may be static or may change over time.

A UE may select one or more ACK/NACK transmission techniques based on one or more criteria. These criteria may include, for example, the number of ACK/NACK bits to send for HARQ feedback, the number of downlink carriers used to send data and associated with one uplink carrier, the number of downlink subframes associated with one uplink subframe (e.g., the ratio of downlink subframes to uplink subframes in TDD), the number of packets sent on each downlink carrier in each downlink subframe, etc. For example, the orthogonal sequence reduction technique may be selected if a selection criterion (e.g., the number of ACK/NACK bits to send, or the number of downlink carriers used to send data) is greater than a first threshold T1, the spatial bundling technique may also be selected if the selection criterion is greater than a second threshold T2, the channel selection technique may also be selected if the selection criterion is greater than a third threshold T3, the subframe bundling technique may also be selected if the selection criterion is greater than a fourth threshold T4, and the carrier bundling technique may also be selected if the selection criterion is greater than a fifth threshold T5, where T5>T4>T3>T2>T1. A set of rules may also be used to select one or more ACK/NACK transmission techniques based on multiple selection criteria and multiple thresholds. These rules may be provided in a table or some other format and may be known to both the UE and the eNB. For clarity, several exemplary designs of sending ACK/NACK information using different combinations of ACK/NACK transmission techniques are described below.

In a first exemplary ACK/NACK transmission design, a UE may utilize a combination of orthogonal sequence reduction and spatial bundling to send ACK/NACK information. In an exemplary design, orthogonal sequence reduction may be selected for use if the number of ACK/NACK bits to send is greater than a B1 threshold, where B1 may be equal to 2. Spatial bundling may be selected for use if the number of ACK/NACK bits to send is greater than a B2 threshold. In one design, B2 may be equal to 8 for the normal cyclic prefix and equal to 6 for the extended cyclic prefix. In another design, B2 may be equal to 6 for both the normal cyclic prefix and the extended cyclic prefix. When the number of ACK/NACK bits to send is between B1 and B2, the UE may select an orthogonal sequence of a suitable length. When the number of ACK/NACK bits to send is greater than B2, spatial bundling may be performed for some or all downlink carriers, e.g., to reduce the number of bits of ACK/NACK information to fit the available payload size for the PUCCH.

The UE may perform spatial bundling for some or all downlink carriers in various manners. In one design, spatial bundling may be performed first for secondary downlink carriers and then for the primary downlink carrier, if necessary. The specific secondary downlink carriers for which to perform spatial bundling may be selected in a predetermined order. For example, the downlink carriers may be assigned indices of 1 through M, and the secondary downlink carriers may be selected for spatial bundling in a sequential order based on their indices (e.g., starting from the primary downlink carrier). For example, B2 may be equal to 8, five downlink carriers 1 through 5 may be used to send data, and two packets may be sent on each downlink carrier with spatial multiplexing. If downlink carrier 3 is the primary downlink carrier, then spatial bundling may be performed for each of downlink carriers 4 and 5 to obtain one bundled ACK/NACK bit for each of these downlink carriers. No spatial bundling may be performed for downlink carriers 1, 2 and 3, and two ACK/NACK bits may be obtained for each of these downlink carriers. A total of 8 bits of ACK/NACK information may be sent with an orthogonal sequence of length one (or no time spreading).

In another design, the UE may select spatial bundling if the number of downlink carriers is greater than a C2 threshold, where C2 may be equal to 3 or some other value. If C2 or fewer downlink carriers are used to send data, then an orthogonal sequence of a suitable length may be selected for use. Otherwise, if more than C2 downlink carriers are used to send data, then spatial bundling may be performed for each downlink carrier on which multiple packets are sent with spatial multiplexing. For example, B2 may be equal to 6, C2 may be equal to 3, and five downlink carriers 1 through 5 may be used to send data transmissions. If three or fewer downlink carriers are used to send data transmissions, then an orthogonal sequence of a suitable length may be selected for use. Otherwise, if more than three downlink carriers are used to send data transmissions, then spatial bundling may be performed first to obtain 5 bundled ACK/NACK bits. An orthogonal sequence of a suitable length may then be selected for use to send the five bundled ACK/NACK bits. In general, spatial bundling may be performed on one or more downlink carriers on which multiple packets are sent, e.g., with spatial multiplexing.

Table 1 shows an exemplary design of sending ACK/NACK information with orthogonal sequence reduction and spatial bundling based on the number of downlink carriers on which data is received. Table 1 assumes that (i) a UE may send up to two packets on each downlink carrier with spatial multiplexing and that (ii) two bits of ACK/NACK information may be mapped to one QPSK modulation symbol, which may be processed as shown in equation (1). The second column of Table 1 shows the processing to send ACK/NACK information on one PUCCH. The third column of Table 1 shows the processing to send ACK/NACK information on two PUCCHs. In Table 1, "OC length" refers to the length of the orthogonal sequence (or orthogonal cover length).

TABLE 1

Orthogonal sequence reduction and spatial bundling

| Number of DL Carriers | Single-Carrier Waveform for Uplink (one PUCCH) | Non-Single-Carrier Waveform for Uplink (two PUCCHs) |
|---|---|---|
| 1 | LTE Release 8 PUCCH in FIG. 5 | N/A |
| 2 | OC length = 2 | N/A |
| 3 | OC length = 1 | 2 parallel PUCCHs: one LTE Release 8 PUCCH and one PUCCH with OC length = 2 |
| 4 | Normal cyclic prefix:<br>1) OC length = 1, or<br>2) OC length = 2 & spatial bundling<br>Extended cyclic prefix:<br>1) OC length = 2 & spatial bundling | 2 parallel PUCCHs: each PUCCH with OC length = 2 |
| 5 | OC length = 1 & spatial bundling &<br>Normal cyclic prefix: 3 DL carriers without spatial bundling (6 bits) and 2 DL carriers with spatial bundling (2 bits), or<br>Extended cyclic prefix: 1 DL carrier without spatial bundling (2 bits) and 4 DL carriers with spatial bundling (4 bits) | Spatial bundling per DL carrier and 2 parallel PUCCHs: one LTE Release 8 PUCCH and one PUCCH with OC length = 2 |

A single-carrier waveform may be obtained by sending one PUCCH, as shown in the second column of Table 1. On the other hand, sending two PUCCHs as shown in the third column of Table 1 may violate the single-carrier waveform. A single-carrier waveform may have a lower peak-to-average power ratio (PAPR), which may be desirable. Two PUCCHs may be sent on different resource blocks and/or using different reference signal sequences and/or different orthogonal sequences.

Table 2 shows another exemplary design of sending ACK/NACK information with orthogonal sequence reduction and spatial bundling in multi-carrier operation. Table 2 assumes that (i) a UE may send two packets on one downlink carrier with spatial multiplexing (denoted as "MIMO"), that (ii) the UE may send one packet on one downlink carrier without spatial multiplexing (denoted as "SIMO"), and that (iii) two bits of ACK/NACK information may be mapped to one QPSK modulation symbol. The design in Table 2 attempts to (i) utilize reduced orthogonal sequence length as much as possible and (ii) minimize spatial bundling as much as possible.

TABLE 2

Orthogonal sequence reduction and spatial bundling

| Cyclic Prefix | OC Length | Number of Payload Bits | Options |
|---|---|---|---|
| Normal | 4 | 2 | 1 DL carrier with MIMO, or 2 DL carriers with SIMO |
| Extended | 3 | 2 | 1 DL carrier with MIMO, or 2 DL carriers with SIMO |
| Normal | 2 | 4 | 2 DL carriers with MIMO, 3 DL carriers with MIMO: 2 DL carriers with spatial bundling and 1 DL carrier without spatial bundling, 4 DL carriers with MIMO and spatial bundling, 5 DL carriers with MIMO and spatial bundling, or Any combination in between |
| Normal | 1 | 8 | 4 DL carriers with MIMO, 5 DL carriers with MIMO: 2 DL carriers with spatial bundling and 3 DL carriers without spatial bundling, or Any combination in between |
| Extended | 1 | 6 | 3 DL carriers with MIMO, 4 DL carriers with MIMO and spatial bundling, 5 DL carriers with MIMO and spatial bundling, or Any combination in between (e.g., 2 DL carriers with MIMO and 2 DL carriers with MIMO and spatial bundling) |

In a second exemplary ACK/NACK transmission design, a UE may utilize a combination of orthogonal sequence reduction, spatial bundling, and carrier bundling to send ACK/NACK information for multiple carriers. Table 3 shows an exemplary design of sending ACK/NACK information with orthogonal sequence reduction, spatial bundling, and carrier bundling. Table 3 assumes that (i) the UE may send two packets on one downlink carrier with spatial multiplexing, that (ii) only a shorter orthogonal sequence of length 2 (OC length=2) is supported, and that (iii) two bits of ACK/NACK information may be mapped to one QPSK modulation symbol. In the design shown in Table 3, the UE may send ACK/NACK information for one or two downlink carriers on one PDCCH without using spatial bundling. The UE may send ACK/NACK information for three or more downlink carriers on one PDCCH with spatial bundling.

Table 4 shows another exemplary design of sending ACK/NACK information for multiple carriers using orthogonal sequence reduction, spatial bundling, and carrier bundling. Table 4 assumes that (i) a UE may send two packets on one downlink carrier with spatial multiplexing, that (ii) the UE may send one packet on one downlink carrier without spatial multiplexing, and that (iii) two bits of ACK/NACK information may be mapped to one QPSK modulation symbol. The design in Table 4 attempts to (i) utilize reduced orthogonal sequence length as much as possible and (ii) minimize spatial bundling and carrier bundling as much as possible.

TABLE 3

Orthogonal sequence reduction, spatial bundling, and carrier bundling

| Number of DL Carriers | Single-Carrier Waveform for Uplink (one PUCCH) | Non-Single-Carrier Waveform for Uplink (two PUCCHs) |
|---|---|---|
| 1 | LTE Release 8 PUCCH in FIG. 5 | N/A |
| 2 | OC length = 2 | N/A |
| 3 | OC length = 2 & spatial bundling | 2 parallel PUCCHs: one LTE Release 8 PUCCH and one PUCCH with OC length = 2 |
| 4 | OC length = 2 & spatial bundling | 2 parallel PUCCHs: each PUCCH with OC length = 2 |
| 5 | OC length = 2 & spatial bundling & carrier bundling for 2 DL carriers | Spatial bundling per DL carrier and 2 parallel PUCCHs: one LTE Release 8 PUCCH and one PUCCH with OC length = 2 |

TABLE 4

Orthogonal sequence reduction, spatial bundling, and carrier bundling

| Cyclic Prefix | OC Length | Number of Payload Bits | Options |
|---|---|---|---|
| Normal | 4 | 2 | 1 DL carrier with MIMO, or<br>2 DL carriers with SIMO |
| Extended | 3 | 2 | 1 DL carrier with MIMO, or<br>2 DL carriers with SIMO |
| Normal | 2 | 4 | 2 DL carriers with MIMO,<br>3 DL carriers with MIMO<br>1 DL carrier with spatial bundling and<br>2 DL carriers without spatial bundling,<br>4 DL carriers: with SIMO or with MIMO and spatial bundling, or<br>5 DL carriers with spatial bundling and carrier bundling for 2 DL carriers |
| Normal | 1 | 8 | 3 DL carriers with MIMO,<br>4 DL carriers with MIMO,<br>5 DL carriers with MIMO and spatial bundling, or<br>Any combination in between (e.g., 3 DL carriers with MIMO & 2 DL carriers with MIMO and spatial bundling) |
| Extended | 1 | 6 | 3 DL carriers with MIMO,<br>4 DL carriers with MIMO and spatial bundling,<br>5 DL carriers with MIMO and spatial bundling,<br>Any combination in between (e.g., 2 DL carriers with MIMO & 2 DL carriers with MIMO and spatial bundling) |

As shown in Tables 2 and 3, a UE may prioritize the ACK/NACK transmission techniques such that orthogonal sequence reduction is utilized first, then spatial bundling is utilized if necessary, and then carrier bundling is utilized last if needed. Spatial bundling and carrier bundling may also be performed based on the PDCCH payload size. The specific downlink carriers on which to perform spatial bundling or carrier bundling may be selected in various manners, as described above.

In a third exemplary ACK/NACK transmission design, a UE may utilize an ordering of ACK/NACK transmission techniques including orthogonal sequence reduction, channel selection, and spatial bundling to send ACK/NACK information. A UE may be configured with multiple ACK/NACK resources to send ACK/NACK information. In one design, the multiple ACK/NACK resources may be assigned semi-statically via upper layer signaling. In another design, the multiple ACK/NACK resources may be assigned dynamically. For example, each transmission of one or more packets on one downlink carrier in one downlink subframe may be associated with a downlink grant sent on a Physical Downlink Control Channel (PDCCH). Multiple downlink grants for multiple transmissions of packets sent on different downlink carriers (in both FDD and TDD) and possibly different downlink subframes (in TDD) may be sent on multiple PDCCHs. Each PDCCH may be sent on a different PDCCH resource that may be mapped to a specific ACK/NACK resource. The ACK/NACK resources assigned to the UE may then be implicitly conveyed by the PDCCH resources used to send downlink grants to the UE. ACK/NACK resources may also be assigned to the UE in other manners.

Table 5 shows an exemplary design of sending ACK/NACK information for multiple carriers with orthogonal sequence reduction, channel selection, and spatial bundling. The design in Table 5 assumes that (i) only a shorter orthogonal sequence of length 2 (OC length=2) is supported, that (ii) two additional bits of ACK/NACK information may be conveyed with channel selection using four assigned ACK/NACK resources, that (iii) a UE may send up to two packets on one downlink carrier in one downlink subframe, and that (iv) two bits of ACK/NACK information may be mapped to one QPSK modulation symbol. In this design, the UE may send ACK/NACK information for one or two downlink carriers on one PDCCH without using channel selection. The UE may send ACK/NACK information for three or more downlink carriers on one PDCCH with channel selection.

TABLE 5

Orthogonal sequence reduction, channel selection, and spatial bundling

| Number of DL Carriers | Single-Carrier Waveform for Uplink (one PUCCH) | Non-Single-Carrier Waveform for Uplink (two PUCCHs) |
|---|---|---|
| 1 | LTE Release 8 PUCCH in FIG. 5 | N/A |
| 2 | OC length = 2 | N/A |
| 3 | OC length = 2 & channel selection | 2 parallel PUCCHs: one LTE Release 8 PUCCH and one PUCCH with OC length = 2 |
| 4 | OC length = 2 & channel selection | 2 parallel PUCCHs: each PUCCH with OC length = 2 |
| 5 | OC length = 2 & channel selection | Spatial bundling per DL carrier |

TABLE 5-continued

Orthogonal sequence reduction, channel selection, and spatial bundling

| Number of DL Carriers | Single-Carrier Waveform for Uplink (one PUCCH) | Non-Single-Carrier Waveform for Uplink (two PUCCHs) |
|---|---|---|
| | | and 2 parallel PUCCHs: one LTE Release 8 PUCCH and one PUCCH with OC length = 2 |

Table 6 shows another exemplary design of sending ACK/NACK information in multi-carrier operation utilizing orthogonal sequence reduction, channel selection, and spatial bundling. The design in Table 6 assumes that (i) two additional bits of ACK/NACK information may be conveyed with channel selection using four assigned ACK/NACK resources, that (ii) a UE may send up to two packets on one downlink carrier in one downlink subframe, and (iii) two bits of ACK/NACK information may be mapped to one QPSK modulation symbol. In this design, the UE may send ACK/NACK information for one or two downlink carriers on one PDCCH without using channel selection. The UE may send ACK/NACK information for three or more downlink carriers on one PDCCH with channel selection.

data is sent on one or more downlink carriers without spatial multiplexing. In this case, ACK/NACK information may be sent differently than in the design shown in Table 5. For example, four ACK/NACK bits may be obtained for four packets, one packet on each of four downlink carriers without spatial multiplexing. These four ACK/NACK bits may be sent with a shorter orthogonal sequence of length 2 (OC length=2) without using channel selection.

Six exemplary designs of sending ACK/NACK information for multiple carriers are shown in Tables 1 to 6. ACK/NACK information may also be sent with orthogonal sequence reduction, bundling, and/or channel selection in other manners. The designs described above may also be

TABLE 6

Orthogonal sequence reduction, channel selection, and spatial bundling

| Number of DL Carriers | Single-Carrier Waveform for Uplink (one PUCCH) | Non-Single-Carrier Waveform for Uplink (two PUCCHs) |
|---|---|---|
| 1 | LTE Release 8 PUCCH in FIG. 5 | N/A |
| 2 | OC length = 2 | N/A |
| 3 | OC length = 1 | N/A |
| 4 | Normal cyclic prefix: OC length = 1, or Extended cyclic prefix: OC length = 1 & either channel selection or spatial bundling | Normal cyclic prefix: not supported, or Extended cyclic prefix: 1) 2 parallel PUCCHs: each PUCCH with OC length = 2, or 2) 2 parallel PUCCHs: one LTE Release 8 PUCCH and one PUCCH with OC length = 1 |
| 5 | OC length = 1 & either channel selection or spatial bundling | Normal cyclic prefix: 1) 2 parallel PUCCHs: one LTE Release 8 PUCCH and one PUCCH with OC length = 1, or Extended cyclic prefix: 1) 2 parallel PUCCHs: one PUCCH with OC length = 2 and one PUCCH with OC length = 1 |

For FDD, up to 2*M ACK/NACK bits may be obtained for up to 2*M packets sent on M downlink carriers in one downlink subframe. These up to 2*M ACK/NACK bits may be sent (i) on one PDCCH without using bundling as shown in the second column of Table 5 or 6 or (ii) on two PDCCHs without using channel selection as shown in the third column of Table 5 or 6.

For TDD, up to 2*M*P ACK/NACK bits may be obtained for up to 2*M*P packets sent on M downlink carriers in P downlink subframes. Subframe bundling may be performed for each downlink carrier across the P downlink subframes to obtain up to 2*M bundled ACK/NACK bits. These up to 2*M bundled ACK/NACK bits may be sent on one or two PDCCHs as shown in Table 5 or 6.

In the design shown in Table 5, 2*M bits of ACK/NACK information may be obtained when two packets are sent on each downlink carrier with spatial multiplexing. Fewer than 2*M bits of ACK/NACK information may be obtained when extended to more than two PUCCHs. However, two PUCCHs may provide a good tradeoff between PAPR and PUCCH payload size.

In the design shown in FIG. 5, a UE may send ACK/NACK information with repetition in two resource blocks. In particular, one or two bits of ACK/NACK information may be mapped to one modulation symbol d(0), which may be processed as shown in equation (1) to obtain N data sequences. The N data sequences may then be sent in N symbol periods in each of two resource blocks, as shown in FIG. 5.

In another design, a UE may send ACK/NACK information with coding in two resource blocks. For example, ACK/NACK information may be encoded (e.g., with a block code) to obtain code bits, which may then be mapped to multiple modulation symbols. One or more modulation symbols may be processed to obtain a first set of N data sequences. One or more remaining modulation symbols may be processed to obtain a second set of N data sequences. The first set of N data sequences may be sent on one resource block, and the second set of N data sequences may be sent on the other resource block.

The coding scheme used for ACK/NACK information may be selected based on various factors such as the number of bits of ACK/NACK information to send, the length of the orthogonal sequence (e.g., 4, 3, 2 or 1), whether normal or extended cyclic prefix is utilized, etc. For example, when OC length=1 is used, the coding scheme used in LTE Release 8 to encode CQI information for transmission on the PUCCH may be re-used to encode ACK/NACK information.

ACK/NACK information may also be sent with coding and bundling. Fewer ACK/NACK bits may be sent with coding for a given PDCCH payload size. Bundling may then be performed to reduce the number of bits of ACK/NACK information to send on the PUCCH. For example, more bits of ACK/NACK information may be sent using a shorter orthogonal sequence length, but these ACK/NACK information bits may have a higher probability of being received in error due to their transmission in fewer symbol periods. Coding may then be used to reduce the probability of error but would result in fewer bits of ACK/NACK information that can be sent on the PUCCH. Spatial bundling and/or other types of bundling may then be performed to reduce the number of bits of ACK/NACK information to send. In general, more bundling may be performed to enable use of a higher code rate for a given PUCCH payload size.

In another aspect, a UE may perform carrier bundling for a subset of all downlink carriers used to send data. Carrier bundling for only some carriers (instead of all carriers) may be used to (i) reduce the number of bits of ACK/NACK information by a sufficient amount to fit the available payload size and/or (ii) provide good performance by bundling only carriers having similar characteristics. Some examples of carrier bundling for only some carriers are shown (i) in Table 3 for the case of 5 downlink carriers with one PUCCH and (ii) in Table 4 for the case with 5 downlink carriers and OC length=2.

The subset of downlink carriers for which to perform carrier bundling may be determined in various manners. In one design, the subset may include downlink carriers in the same frequency band. These downlink carriers may observe similar long-term channel conditions and may thus have similar performance.

In another design, the subset may include downlink carriers observing similar interference conditions. For example, in a heterogeneous network, one or more downlink carriers may be assigned to macro eNBs, and one or more other downlink carriers may be assigned to home eNBs (HeNBs). Downlink carriers assigned to eNBs of different types may observe different interference conditions. Hence, the subset may include downlink carriers assigned to eNBs of a particular type.

In yet another design, the subset may include downlink carriers determined to have similar long-term channel conditions. For example, a UE may estimate the channel quality of different downlink carriers. The subset may then include downlink carriers with similar long-term channel quality.

The subset of downlink carriers may also be determined in other manners. In one design, the subset of downlink carriers may be determined by a network entity (e.g., a serving eNB or a network controller) for a UE and may be signaled to the UE (e.g., via upper layer signaling). In another design, the subset of downlink carriers may be determined by a UE and explicitly or implicitly signaled to its serving eNB. The subset of downlink carriers may also be determined and conveyed in other manners.

The downlink carriers in the subset may observe similar channel and/or interference conditions. Hence, the same or similar MCSs may be used for these downlink carriers, and the same or similar target termination may be selected for these downlink carriers. Packets sent on these downlink carriers may have similar likelihood of being decoded correctly. Hence, there may be higher likelihood of all ACKs or all NACKs being obtained for these packets, in which case bundling these ACKs or NACKs may result in less performance loss.

Figures 6, 7:
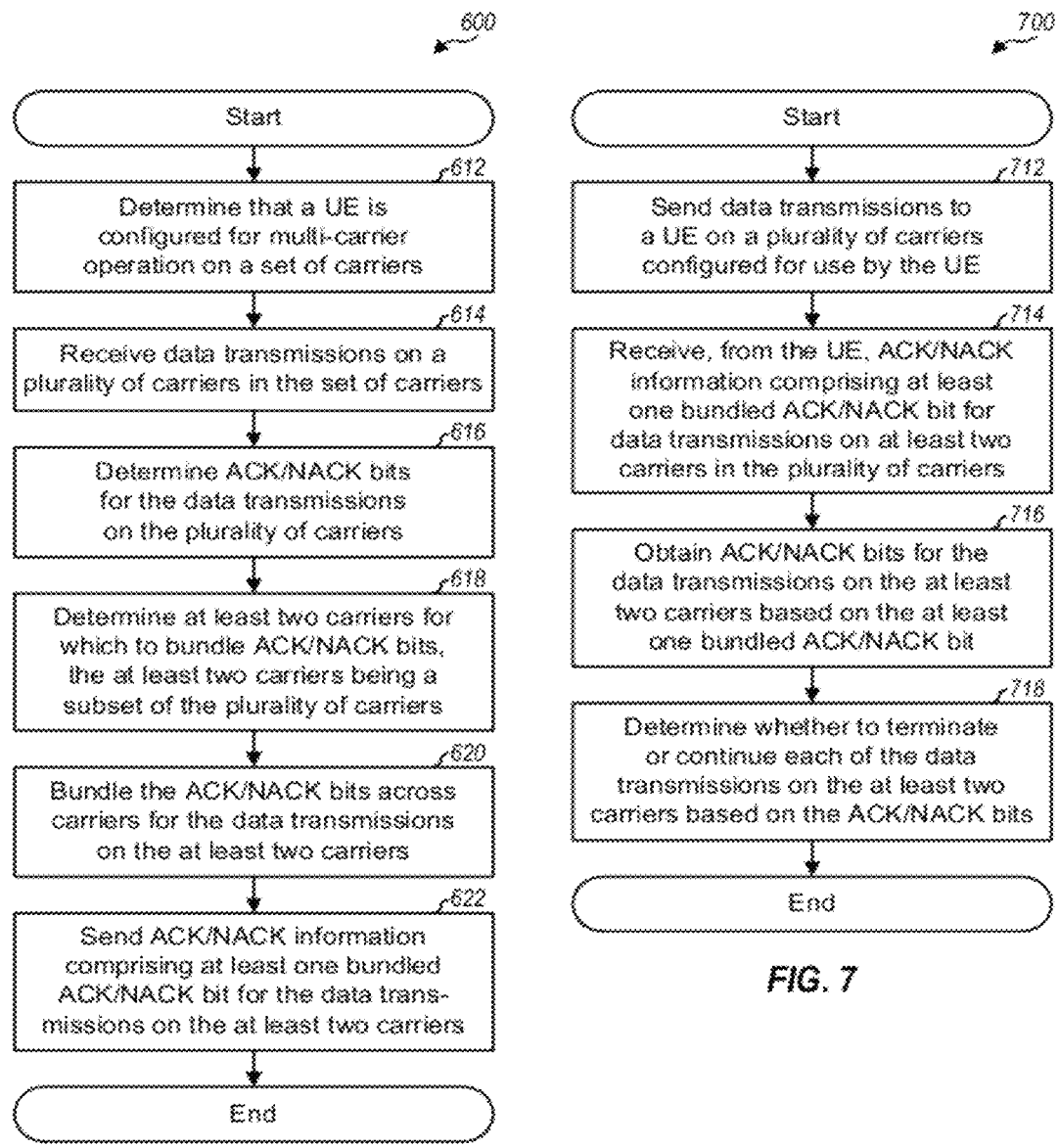
FIGS. 6 and 7 show processes for sending and receiving, respectively, ACK/NACK information with carrier bundling on a subset of carriers.

FIG. 6 shows a design of a process 600 for sending ACK/NACK information with carrier bundling on a subset of carriers. Process 600 may be performed by a UE (as described below) or some other entity. The UE may determine that it is configured for multi-carrier operation on a set of carriers (block 612). The UE may receive data transmissions on a plurality of carriers in the set of carriers (block 614). The plurality of carriers may include all or some of the carriers in the set of carriers configured for the UE. The UE may determine ACK/NACK bits for the data transmissions on the plurality of carriers (block 616). Each data transmission may correspond to a transmission of one or more packets, and an ACK/NACK bit may be determined for each packet. The UE may also determine at least two carriers for which to bundle ACK/NACK bits, with the at least two carriers being a subset of the plurality of carriers on which data transmissions are received (block 618). The UE may bundle the ACK/NACK bits across carriers for the data transmissions on the at least two carriers (block 620). The UE may send ACK/NACK information comprising at least one bundled ACK/NACK bit for the data transmissions on the at least two carriers (block 622). The ACK/NACK information may further comprise at least one ACK/NACK bit for at least one data transmission on at least one remaining carrier in the plurality of carriers, with no bundling of the at least one ACK/NACK bit across carriers. The UE may send the ACK/NACK information on a single uplink carrier associated with the plurality of carriers for the downlink.

The specific carriers for which to bundle ACK/NACK bits may be determined in various manners. In one design, the at least two carriers for which to bundle ACK/NACK bits may be selected from the same frequency band. In some other designs, the at least two carriers for which to bundle ACK/NACK bits may be determined based on (i) the number of carriers on which data transmissions are received, (ii) the total number of ACK/NACK bits for the data transmissions on the plurality of carriers, (iii) the number of payload bits available to send the ACK/NACK information, (iv) a data transmission mode for each of the plurality of carriers, (v) a target termination for each of the plurality of carriers, (vi) interference characteristics associated with each carrier in the set of carriers configured for the UE (e.g., carriers with similar interference characteristics may be selected for bundling), and/or other criteria. Carrier bundling may also be performed based on one or more thresholds. For example, carrier bundling may be performed when the total number of ACK/NACK bits exceeds a threshold number of ACK/NACK bits or the number of carriers on which data transmissions are received exceeds a threshold number of carriers. In another design, the UE may receive a configuration message indicating a group of carriers for which to bundle ACK/NACK bits across carriers. The UE may then determine the at least two carriers based on the group of carriers.

The UE may perform carrier bundling in combination with spatial bundling and/or subframe bundling. In one design, the UE may perform spatial bundling of ACK/NACK bits for data transmissions on at least one carrier in the plurality of carriers. In another design, the UE may perform subframe bundling of ACK/NACK bits for data transmissions on at least one carrier in a plurality of subframes. In yet another design, the UE may perform both spatial bundling and subframe bundling. The UE may perform carrier bundling, spatial bundling, and/or subframe bundling based on a set of rules, which may be provided in a table, e.g., any of Tables 1 through 6.

FIG. 7 shows a design of a process 700 for receiving ACK/NACK information sent with carrier bundling on a subset of carriers. Process 700 may be performed by a base station/eNB (as described below) or some other entity. The base station may send data transmissions to a UE on a plurality of carriers configured for use by the UE (block 712). The base station may thereafter receive, from the UE, ACK/NACK information comprising at least one bundled ACK/NACK bit for data transmissions on at least two carriers in the plurality of carriers (block 714). The at least two carriers may be a subset of the plurality of carriers. The at least one bundled ACK/NACK bit may be obtained by bundling ACK/NACK bits across carriers for the data transmissions on the at least two carriers. The base station may obtain ACK/NACK bits for the data transmissions on the at least two carriers based on the at least one bundled ACK/NACK bit (block 716). The base station may determine whether to terminate or continue each of the data transmissions on the at least two carriers based on the ACK/NACK bits (block 718).

Figures 8, 9:
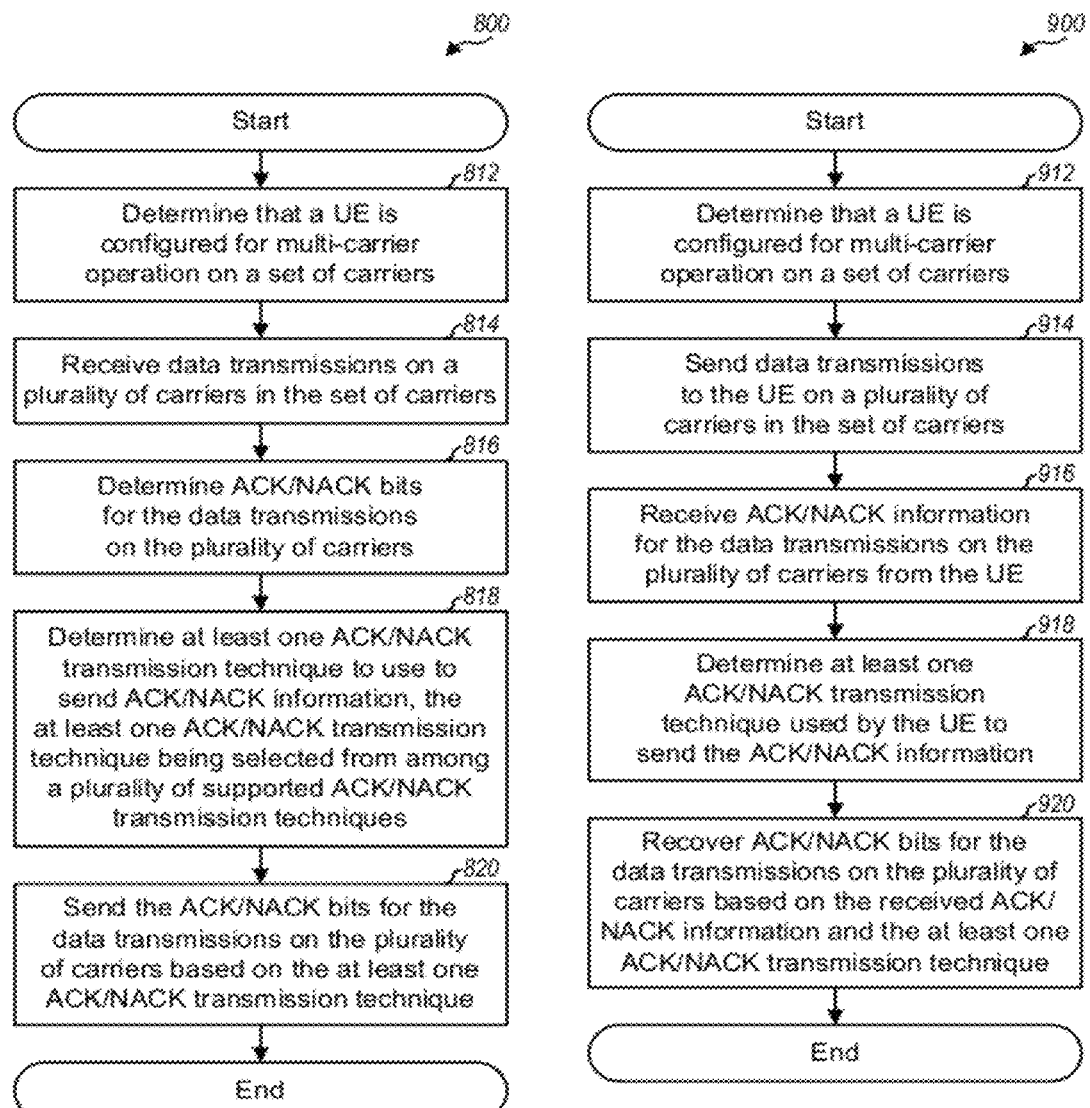
FIGS. 8 and 9 show processes for sending and receiving, respectively, ACK/NACK information using different ACK/NACK transmission techniques.

FIG. 8 shows a design of a process 800 for sending ACK/NACK information using different ACK/NACK transmission techniques. Process 800 may be performed by a UE (as described below) or some other entity. The UE may determine that it is configured for multi-carrier operation on a set of carriers (block 812). The UE may receive data transmissions on a plurality of carriers in the set of carriers (block 814). The UE may determine ACK/NACK bits for the data transmissions on the plurality of carriers (block 816). The UE may determine at least one ACK/NACK transmission technique to use for sending ACK/NACK information (block 818). The at least one ACK/NACK transmission technique may be selected from among a plurality of supported ACK/NACK transmission techniques. The UE may send the ACK/NACK bits for the data transmissions on the plurality of carriers based on the at least one ACK/NACK transmission technique (block 820).

The at least one ACK/NACK transmission technique may include one or more of the following: (i) an orthogonal sequence reduction technique for sending ACK/NACK bits using an orthogonal sequence of a shorter length than a nominal length, (ii) a channel selection technique for sending ACK/NACK information using one of multiple resources, (iii) a spatial bundling technique for bundling ACK/NACK bits for multiple packets sent concurrently on a carrier with spatial multiplexing, (iv) a carrier bundling technique for bundling ACK/NACK bits for multiple packets sent on multiple carriers in a subframe, (v) a subframe bundling technique for bundling ACK/NACK bits for multiple packets sent on a carrier in multiple subframes, and (vi) other ACK/NACK transmission techniques.

The at least one ACK/NACK transmission technique may be selected based on one or more criteria, which may include (i) the number of carriers on which data transmissions are received, (ii) the total number of ACK/NACK bits for the data transmissions on the plurality of carriers, (iii) the data transmission format for each of the plurality of carriers, (iv) the ratio of downlink subframes to uplink subframes in TDD, (v) the priorities of the plurality of supported ACK/NACK transmission techniques, and/or (vi) other criteria. The data transmission format for each carrier may indicate the number of packets to send concurrently on that carrier, e.g., may indicate spatial multiplexing or no spatial multiplexing.

In one design, a particular ACK/NACK transmission technique (e.g., the orthogonal sequence reduction technique, the spatial bundling technique, or the channel selection technique) may be selected if a selection criterion exceeds a threshold. For example, the particular ACK/NACK transmission technique may be selected if the total number of ACK/NACK bits is greater than a predetermined value or if the number of carriers on which data transmissions are received is greater than a predetermined threshold. Different predetermined values or different predetermined thresholds may be used to select different ACK/NACK transmission techniques. In another design, the supported ACK/NACK transmission techniques may be selected based on a set of rules, which may be provided in a table, e.g., any of Tables 1 through 6.

FIG. 9 shows a design of a process 900 for receiving ACK/NACK information sent using different ACK/NACK transmission techniques. Process 900 may be performed by a base station (as described below) or some other entity. The base station may determine that a UE is configured for multi-carrier operation on a set of carriers (block 912). The base station may send data transmissions to the UE on a plurality of carriers in the set of carriers (block 914). The base station may receive ACK/NACK information for the data transmissions on the plurality of carriers from the UE (block 916). The base station may determine at least one ACK/NACK transmission technique used by the UE to send the ACK/NACK information (block 918). The at least one ACK/NACK transmission technique may be selected from among a plurality of supported ACK/NACK transmission techniques. The ACK/NACK information may be sent by the UE based on the at least one ACK/NACK transmission technique. The base station may recover ACK/NACK bits for the data transmissions on the plurality of carriers based on the received ACK/NACK information and the at least one ACK/NACK transmission technique (block 920). For example, the ACK/NACK information may comprise one or more bundled ACK/NACK bit, and the base station may perform unbundling of each bundled ACK/NACK bit based on the ACK/NACK transmission mode.

In yet another aspect, a number of ACK/NACK transmission modes may be supported, and one ACK/NACK transmission mode may be selected for use at any given moment. An ACK/NACK transmission mode may specify a specific way of sending ACK/NACK information and may utilize one or more ACK/NACK transmission techniques. For example, a first ACK/NACK transmission mode may utilize orthogonal sequence reduction, a second ACK/NACK transmission mode may utilize orthogonal sequence reduction and spatial bundling, a third ACK/NACK transmission mode may utilize orthogonal sequence reduction and channel selection, a fourth ACK/NACK transmission mode may utilize orthogonal sequence reduction, channel selection, and spatial bundling, etc.

Figure 10:
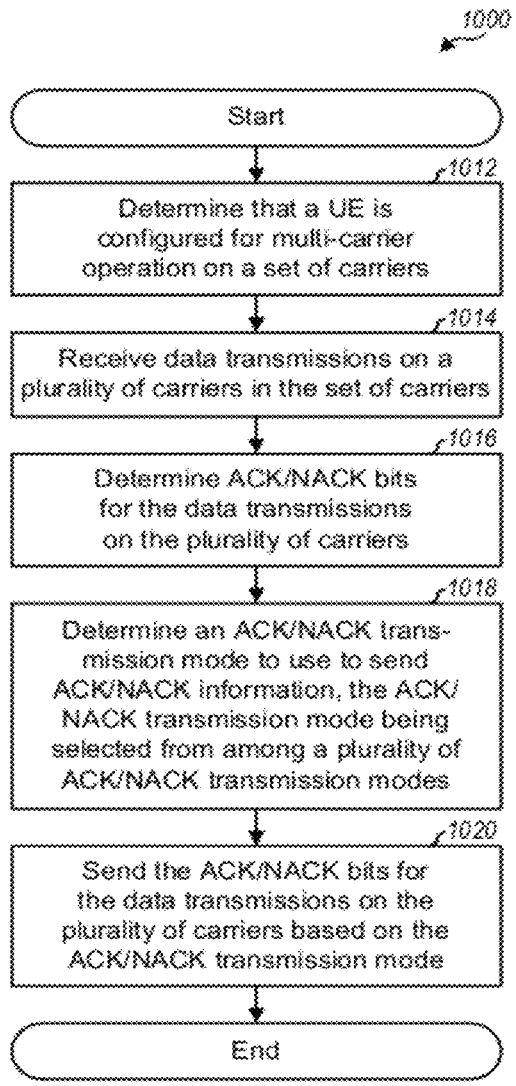
FIGS. 10 and 11 show processes for sending and receiving, respectively, ACK/NACK information using one of a number of ACK/NACK transmission modes.

FIG. 10 shows a design of a process 1000 for sending ACK/NACK information using one of a number of ACK/NACK transmission modes. Process 1000 may be performed by a UE (as described below) or some other entity.

The UE may determine that it is configured for multi-carrier operation on a set of carriers (block 1012). The UE may receive data transmissions on a plurality of carriers in the set of carriers (block 1014). The UE may determine ACK/NACK bits for the data transmissions on the plurality of carriers (block 1016). The UE may determine an ACK/NACK transmission mode to use to send ACK/NACK information (block 1018). The ACK/NACK transmission mode may be selected from among a plurality of ACK/NACK transmission modes. The UE may send the ACK/NACK bits for the data transmissions on the plurality of carriers based on the ACK/NACK transmission mode (block 1020).

The ACK/NACK transmission mode may be selected based on one or more criteria, which may include (i) the number of carriers on which data transmissions are received, (ii) the total number of ACK/NACK bits for the data transmissions on the plurality of carriers, (iii) the data transmission format for each of the plurality of carriers, (iv) the ratio of downlink subframes to uplink subframes in TDD, and/or (v) other criteria.

In one design, the plurality of ACK/NACK transmission modes may include at least two ACK/NACK transmission modes using orthogonal sequences of different lengths. In another design, the plurality of ACK/NACK transmission modes may include at least one ACK/NACK transmission mode that bundles ACK/NACK bits and at least one other ACK/NACK transmission mode that does not bundle ACK/NACK bits. In yet another design, the plurality of ACK/NACK transmission modes may include at least one ACK/NACK transmission mode that uses channel selection to send ACK/NACK information and at least one other ACK/NACK transmission mode that does not use channel selection to send ACK/NACK information. The plurality of ACK/NACK transmission modes may also include other combinations of ACK/NACK transmission techniques.

Figure 11:
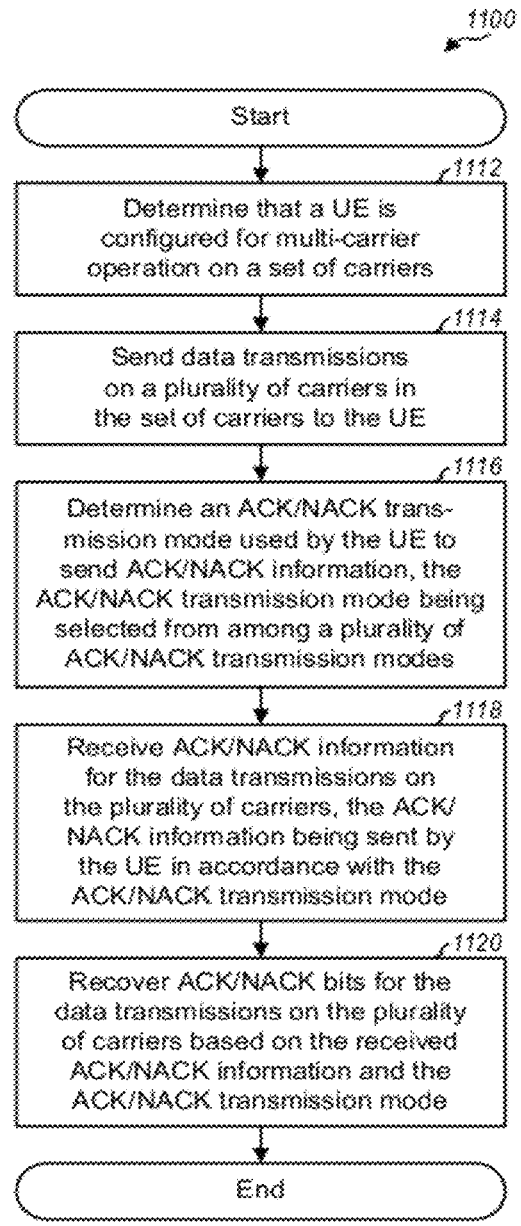

FIG. 11 shows a design of a process 1100 for receiving ACK/NACK information sent using one of a number of ACK/NACK transmission modes. Process 1100 may be performed by a base station (as described below) or some other entity. The base station may determine that a UE is configured for multi-carrier operation on a set of carriers (block 1112). The base station may send data transmissions on a plurality of carriers in the set of carriers to the UE (block 1114). The base station may determine an ACK/NACK transmission mode used by the UE to send ACK/NACK information (block 1116). The ACK/NACK transmission mode may be selected from among a plurality of ACK/NACK transmission modes based on one or more criteria described above. The base station may receive ACK/NACK information for the data transmissions on the plurality of carriers (block 1118). The ACK/NACK information may be sent by the UE in accordance with the ACK/NACK transmission mode. The base station may recover ACK/NACK bits for the data transmissions on the plurality of carriers based on the received ACK/NACK information and the ACK/NACK transmission mode (block 1120).

Figure 12:
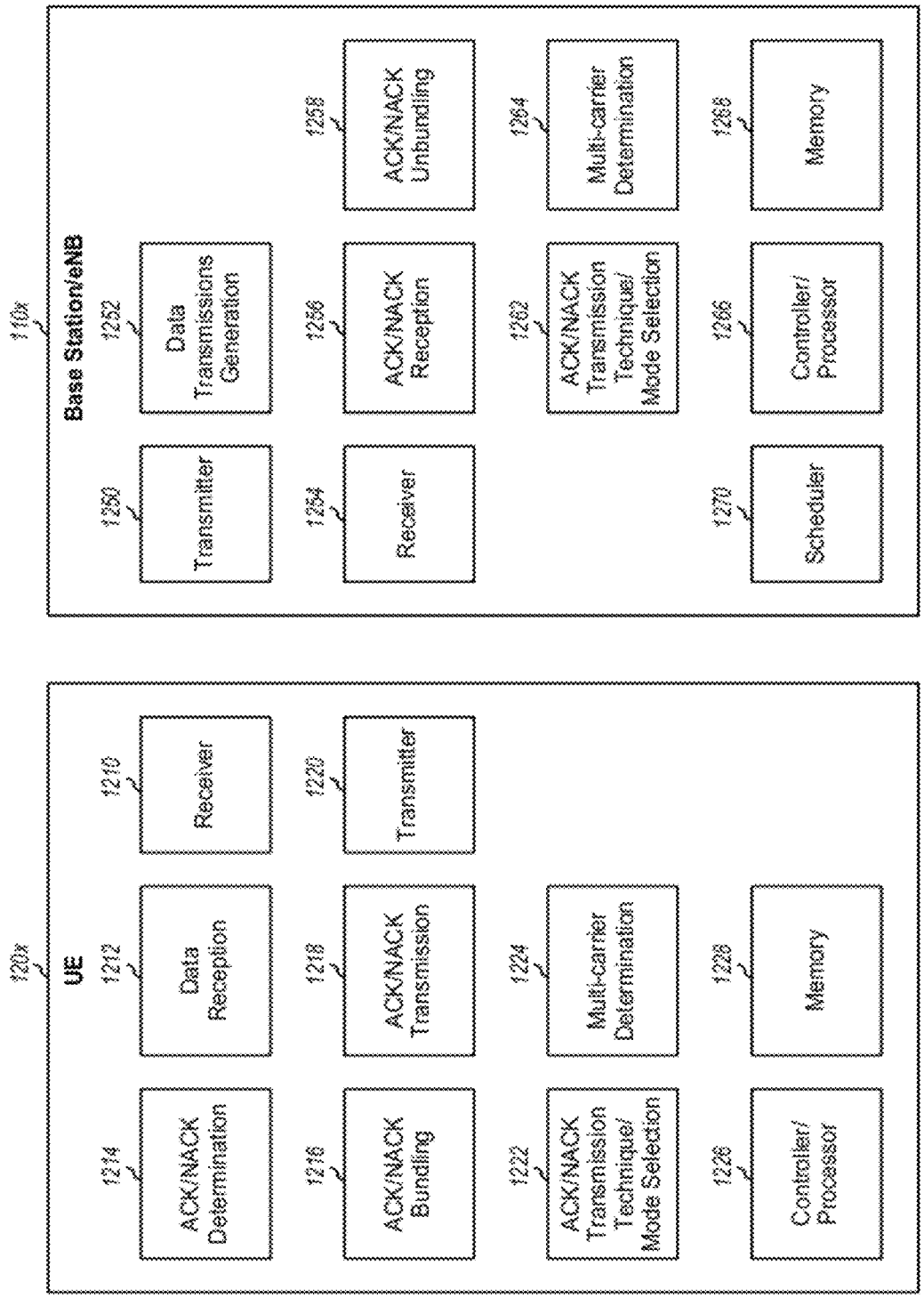
FIG. 12 shows a block diagram of a base station and a UE.

FIG. 12 shows a block diagram of a design of a base station/eNBs 110x and a UE 120x, which may be one of the base stations/eNBs and one of the UEs in FIG. 1. Within UE 120x, a receiver 1210 may receive and process downlink signals comprising data transmissions sent by base stations and possibly other stations. A module 1212 may process (e.g., demodulate and decode) the received data transmissions. A module 1214 may determine ACK/NACK bits for the received data transmissions. A module 1216 may perform spatial bundling, carrier bundling, and/or subframe bundling of the ACK/NACK bits, if applicable. Module 1216 may generate ACK/NACK information, which may comprise one or more bundled ACK/NACK bits and/or one or more unbundled ACK/NACK bits. A module 1222 may determine one or more ACK/NACK transmission techniques and/or an ACK/NACK transmission mode to use to send the ACK/NACK information. A module 1218 may send the ACK/NACK information in accordance with the selected ACK/NACK transmission technique(s) and/or mode. A transmitter 1220 may transmit an uplink signal comprising the ACK/NACK information, other information, and/or data. A module 1224 may determine a multi-carrier configuration for UE 120x. For example, module 1224 may determine a set of carriers configured for UE 120x, which carriers to apply carrier bundling, etc. The various modules within UE 120x may operate as described above. A controller/processor 1226 may direct the operation of various modules within UE 120x. A memory 1228 may store data and program codes for UE 120x.

Within base station 110x, a module 1252 may generate data transmissions for UE 120x and/or other UEs. A transmitter 1254 may generate a downlink signal comprising the data transmissions. A receiver 1254 may receive and process uplink signals transmitted by UE 120x and other UEs. A module 1262 may determine one or more ACK/NACK transmission techniques and/or an ACK/NACK transmission mode used by UE 120x to send ACK/NACK information. A module 1256 may process a received signal in accordance with the determined ACK/NACK transmission technique(s) and/or mode to recover the ACK/NACK information sent by UE 120x. A module 1258 may unbundle each bundled ACK/NACK bit. A module 1264 may determine a multi-carrier configuration for UE 120x and may determine a set of carriers configured for UE 120x, which carriers to apply carrier bundling, etc. The various modules within base station 110x may operate as described above. A controller/processor 1266 may direct the operation of various modules within base station 110x. A memory 1268 may store data and program codes for base station 110x. A scheduler 1270 may schedule UEs for data transmissions.

The modules in FIG. 12 may comprise processors, electronic devices, hardware devices, electronic components, logical circuits, memories, software codes, firmware codes, etc., or any combination thereof.

Figure 13:
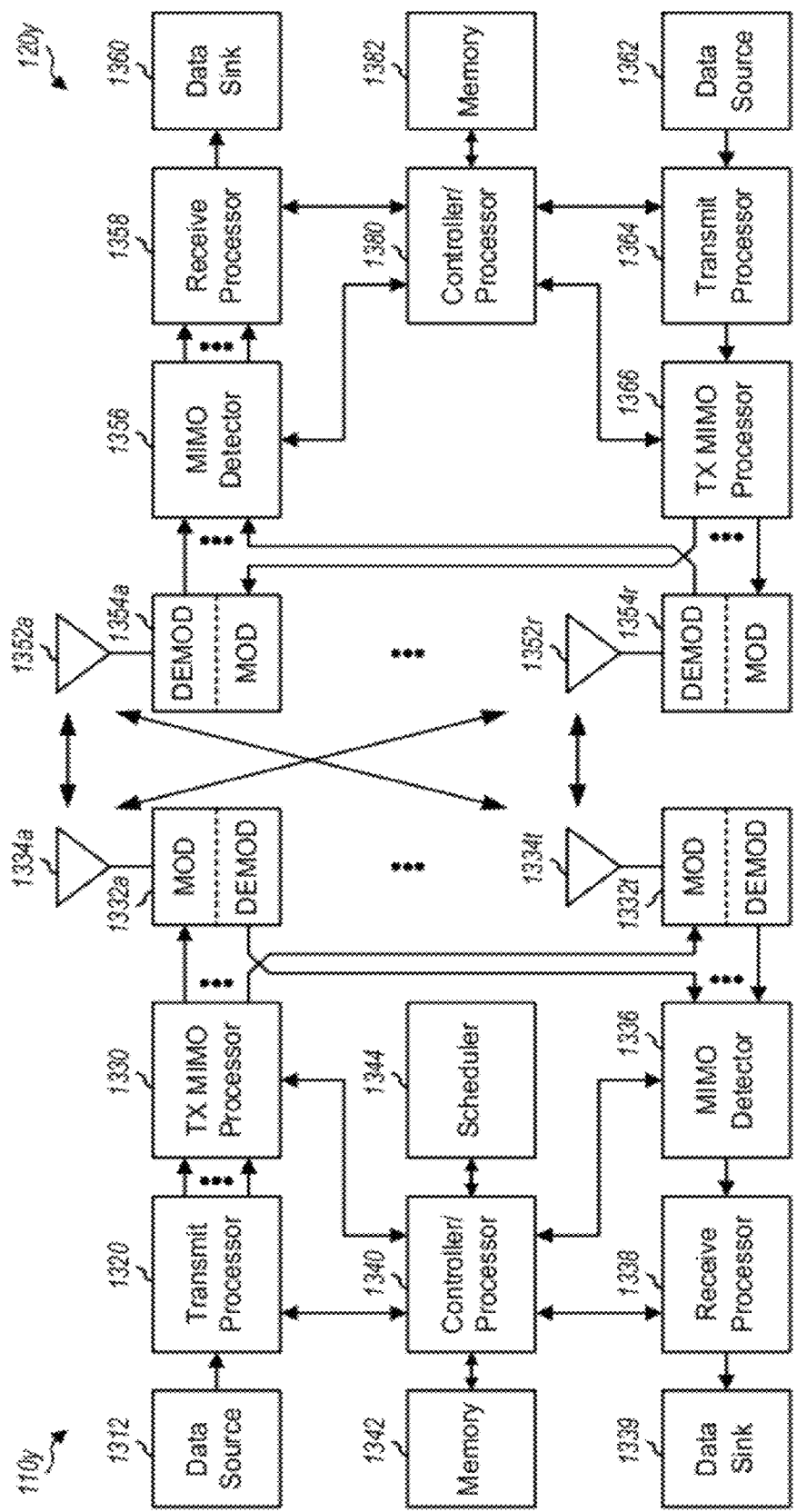
FIG. 13 shows another block diagram of a base station and a UE.

FIG. 13 shows a block diagram of a design of a base station/eNB 110y and a UE 120y, which may be one of the base stations/eNBs and one of the UEs in FIG. 1. Base station 110y may be equipped with T antennas 1334a through 1334t, and UE 120y may be equipped with R antennas 1352a through 1352r, where in general $T \geq 1$ and $R \geq 1$.

At base station 110y, a transmit processor 1320 may receive data from a data source 1312 for one or more UEs, process (e.g., encode and modulate) the data for each UE based on one or more modulation and coding schemes selected for that UE, and provide data symbols for all UEs. Transmit processor 1320 may also process control information (e.g., for downlink grants, configuration messages, etc.) and provide control symbols. Processor 1320 may also generate reference symbols for reference signals. A transmit (TX) multiple-input multiple-output (MIMO) processor 1330 may precode the data symbols, the control symbols, and/or the reference symbols (if applicable) and may provide T output symbol streams to T modulators (MOD) 1332a through 1332t. Each modulator 1332 may process its output symbol stream (e.g., for OFDM, etc.) to obtain an output sample stream. Each modulator 1332 may further condition (e.g., convert to analog, amplify, filter, and upconvert) its output sample stream to obtain a downlink signal. T downlink signals from modulators 1332a through 1332t may be transmitted via T antennas 1334a through 1334t, respectively.

At UE 120y, antennas 1352a through 1352r may receive the downlink signals from base station 110y and/or other base stations and may provide received signals to demodulators (DEMODs) 1354a through 1354r, respectively. Each demodulator 1354 may condition (e.g., filter, amplify, downconvert, and digitize) its received signal to obtain input samples. Each demodulator 1354 may further process the input samples (e.g., for OFDM, etc.) to obtain received symbols. A MIMO detector 1356 may obtain received symbols from all R demodulators 1354a through 1354r, perform MIMO detection on the received symbols, and provide detected symbols. A receive processor 1358 may process (e.g., demodulate and decode) the detected symbols, provide decoded data for UE 120y to a data sink 1360, and provide decoded control information to a controller/processor 1380.

On the uplink, at UE 120y, a transmit processor 1364 may receive and process data from a data source 1362 and control information (e.g., ACK/NACK information) from controller/processor 1380. Processor 1364 may also generate reference symbols for one or more reference signals. The symbols from transmit processor 1364 may be precoded by a TX MIMO processor 1366 if applicable, further processed by modulators 1354a through 1354r (e.g., for SC-FDM, OFDM, etc.), and transmitted to base station 110y. At base station 110y, the uplink signals from UE 120y and other UEs may be received by antennas 1334, processed by demodulators 1332, detected by a MIMO detector 1336 if applicable, and further processed by a receive processor 1338 to obtain decoded data and control information sent by UE 120y and other UEs. Processor 1338 may provide the decoded data to a data sink 1339 and the decoded control information to controller/processor 1340.

Controllers/processors 1340 and 1380 may direct the operation at base station 110y and UE 120y, respectively. Processor 1340 and/or other processors and modules at base station 110y may perform or direct process 700 in FIG. 7, process 900 in FIG. 9, process 1100 in FIG. 11, and/or other processes for the techniques described herein. Processor 1380 and/or other processors and modules at UE 120y may perform or direct process 600 in FIG. 6, process 800 in FIG. 8, process 1000 in FIG. 10, and/or other processes for the techniques described herein. Memories 1342 and 1382 may store data and program codes for base station 110y and UE 120y, respectively. A scheduler 1344 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving data transmissions on a plurality of carriers configured for use by a user equipment (UE);
determining acknowledgement/negative acknowledgement (ACK/NACK) bits for the data transmissions at the UE;
determining a plurality of ACK/NACK transmission techniques comprising at least a cross-carrier bundling technique in which ACK/NACK bits corresponding to data transmissions on a subset of two or more carriers in the plurality of carriers are bundled and a bundling technique that is not associated with the cross-carrier bundling technique;
determining, based at least in part on a total number of the ACK/NACK bits for the data transmissions received on the plurality of carriers, to use the cross-carrier bundling technique for sending the ACK/NACK bits for the data transmissions, wherein the bundling technique that is not associated with the cross-carrier bundling technique is prioritized over the cross-carrier bundling technique when the total number of the ACK/NACK bits is less than a threshold;
determining a subset of at least two carriers of the plurality of carriers for which to bundle the ACK/NACK bits using the cross-carrier bundling technique;
bundling ACK/NACK bits corresponding to the data transmissions on the at least two carriers of the subset with the cross-carrier bundling technique;
bundling ACK/NACK bits corresponding to the data transmissions with the bundling technique that is not associated with the cross-carrier bundling technique; and
sending, by the UE, ACK/NACK information comprising ACK/NACK bits bundled according to the bundling techniques.

2. The method of claim 1, wherein the determining the subset of at least two carriers for which to bundle ACK/NACK bits comprises selecting the at least two carriers from a same frequency band.

3. The method of claim 1, wherein determining the subset of the at least two carriers for which to bundle ACK/NACK bits is further based on a number of carriers on which the data transmissions are received.

4. The method of claim 1, wherein the determining the subset of at least two carriers for which to bundle ACK/NACK bits is further based on a number of payload bits available to send the ACK/NACK information.

5. The method of claim 1, wherein the determining the subset of at least two carriers for which to bundle ACK/NACK bits comprises selecting the at least two carriers based on a data transmission mode for each of the plurality of carriers.

6. The method of claim 1, wherein determining the subset of the at least two carriers for which to bundle ACK/NACK bits comprises:
receiving a configuration message indicating a group of carriers for which to bundle ACK/NACK bits across carriers; and
determining the at least two carriers in accordance with the group of carriers.

7. The method of claim 1, wherein the determining the subset of at least two carriers for which to bundle ACK/NACK bits comprises:
selecting the at least two carriers based on a target termination for each of the plurality of carriers.

8. The method of claim 1, wherein the determining the subset of at least two carriers for which to bundle ACK/NACK bits comprises:
determining interference characteristics associated with each carrier in the plurality of carriers, and
selecting the at least two carriers based on a similarity of interference characteristics.

9. The method of claim 1, wherein the ACK/NACK information further comprises at least one ACK/NACK bit for at least one data transmission on at least one remaining carrier in the plurality of carriers, with no bundling of the at least one ACK/NACK bit across carriers.

10. The method of claim 1, wherein the sending ACK/NACK information comprises sending the ACK/NACK information on a single uplink carrier associated with the plurality of carriers.

11. The method of claim 1, wherein the bundling ACK/NACK bits corresponding to the data transmissions with the bundling technique that is not associated with the cross-carrier bundling technique comprises:
performing spatial bundling of ACK/NACK bits for data transmissions on at least one carrier in the plurality of carriers.

12. The method of claim 1, wherein the bundling ACK/NACK bits corresponding to the data transmissions with the bundling technique that is not associated with the cross-carrier bundling technique comprises:
performing subframe bundling of ACK/NACK bits for data transmissions on at least one carrier in a plurality of subframes, the at least one carrier being among the plurality of carriers.

13. An apparatus for wireless communication, comprising:
means for receiving data transmissions on a plurality of carriers configured for use by a user equipment (UE);
means for determining acknowledgement/negative acknowledgement (ACK/NACK) bits for the data transmissions on the plurality of carriers at the UE;
means for determining a plurality of ACK/NACK transmission techniques comprising at least a cross-carrier bundling technique in which ACK/NACK bits corresponding to data transmissions on a subset of two or more carriers in the plurality of carriers are bundled and a bundling technique that is not associated with the cross-carrier bundling technique;
means for determining, based at least in part on a total number of the ACK/NACK bits for the data transmissions received on the plurality of carriers, to use the cross-carrier bundling technique for sending the ACK/NACK bits for the data transmissions, wherein the bundling technique that is not associated with the cross-carrier bundling technique is prioritized over the cross-carrier bundling technique when the total number of the ACK/NACK bits is less than a threshold;

means for determining a subset of at least two carriers of
the plurality of carriers for which to bundle the ACK/
NACK bits using the cross-carrier bundling technique;
means for bundling ACK/NACK bits corresponding to
the data transmissions on the at least two carriers of the
subset with the cross-carrier bundling technique;
means for bundling ACK/NACK bits corresponding to
the data transmissions with the bundling technique that
is not associated with the cross-carrier bundling technique; and
means for sending ACK/NACK information comprising
ACK/NACK bits bundled according to the bundling
techniques.

14. The apparatus of claim 13, wherein the means for determining the subset of at least two carriers for which to bundle ACK/NACK bits is further based on a number of carriers on which data transmissions are received, a number of payload bits available to send the ACK/NACK information, a frequency band of each of the plurality of carriers, a data transmission mode for each of the plurality of carriers, a target termination for each of the plurality of carriers, interference characteristics associated with each of the plurality of carriers, a configuration message for the UE, or any combination thereof.

15. The apparatus of claim 13, wherein the ACK/NACK information further comprises at least one ACK/NACK bit for at least one data transmission on at least one remaining carrier in the plurality of carriers, with no bundling of the at least one ACK/NACK bit across carriers.

16. An apparatus for wireless communication, comprising:
at least one processor configured to:
receive data transmissions on a plurality of carriers
configured for use by a user equipment (UE),
determine acknowledgement/negative acknowledgement (ACK/NACK) bits for the data transmissions
on the plurality of carriers at the UE,
determine a plurality of ACK/NACK transmission
techniques comprising at least a cross-carrier bundling technique in which ACK/NACK bits corresponding to data transmissions on a subset of two or
more carriers in the plurality of carriers are bundled
and a bundling technique that is not associated with
the cross-carrier bundling technique;
determine, based at least in part on a total number of the
ACK/NACK bits for the data transmissions received
on the plurality of carriers, to use the cross-carrier
bundling technique for sending the ACK/NACK bits
for the data transmissions, wherein the bundling
technique that is not associated with the cross-carrier
bundling technique is prioritized over the cross-carrier bundling technique when the total number of
the ACK/NACK bits is less than a threshold;
determine a subset at least two carriers of the plurality
of carriers for which to bundle the ACK/NACK bits
using the cross-carrier bundling technique,
bundle ACK/NACK bits corresponding to the data
transmissions on the at least two carrier of the subset
with the cross-carrier bundling technique,
bundle ACK/NACK bits corresponding to the data
transmissions with the bundling technique that is not
associated with the cross-carrier bundling technique,
and
send ACK/NACK information comprising ACK/
NACK bits bundled according to the bundling techniques; and
a memory coupled to the at least one processor.

17. The apparatus of claim 16, wherein the determining the subset of at least two carriers for which to bundle ACK/NACK bits is further based on a number of carriers on which data transmissions are received, a number of payload bits available to send the ACK/NACK information, a frequency band of each of the plurality of carriers, a data transmission mode for each of the plurality of carriers, a target termination for each of the plurality of carriers, interference characteristics associated with each of the plurality of carriers, a configuration message for the UE, or any combination thereof.

18. The apparatus of claim 16, wherein the ACK/NACK information further comprises at least one ACK/NACK bit for at least one data transmission on at least one remaining carrier in the plurality of carriers, with no bundling of the at least one ACK/NACK bit across carriers.

19. A non-transitory computer-readable medium storing computer executable code, comprising code for:
receiving data transmissions on a plurality of carriers
configured for use by a user equipment (UE),
determining acknowledgement/negative acknowledgement (ACK/NACK) bits for the data transmissions on
the plurality of carriers at the UE,
determining a plurality of ACK/NACK transmission techniques in which ACK/NACK bits corresponding to
data transmissions on a subset of two or more carriers
in the plurality of carriers are bundled and a bundling
technique that is not associated with the cross-carrier
bundling technique,
determining, based at least in part on a total number of the
ACK/NACK bits for the data transmissions received on
the plurality of carriers, to use the carrier-carrier bundling technique for sending the ACK/NACK bits for
the data transmissions, wherein the bundling technique
that is not associated with the cross-carrier bundling
technique is prioritized over the cross-carrier bundling
technique when the total number of the ACK/NACK
bits is less than a threshold;
determining a subset of at least two carriers of the
plurality of carriers for which to bundle the ACK/
NACK bits using the cross-carrier bundling technique,
bundling the ACK/NACK bits corresponding to the data
transmissions on the at least two carriers of the subset
with the cross-carrier bundling technique, and
sending ACK/NACK information comprising ACK/
NACK bits bundled according to the bundling techniques.

20. A method for wireless communication, comprising:
sending data transmissions to a user equipment (UE) on a
plurality of carriers configured for use by the UE;
receiving from the UE acknowledgement/negative
acknowledgement (ACK/NACK) information comprising at least one bundled ACK/NACK bit relating to
data transmissions on at least two carriers of the
plurality of carriers, the at least two carriers selected
based on a total number of ACK/NACK bits for the
data transmissions on the plurality of carriers;
determining a plurality of ACK/NACK transmission techniques comprising at least a cross-carrier bundling
technique in which ACK/NACK bits corresponding to
data transmissions on a subset of two or more carriers
in the plurality of carriers are bundled and a bundling
technique that is not associated with the cross-carrier
bundling technique; and
obtaining ACK/NACK bits for the data transmissions on
the at least two carriers based on the at least one
bundled ACK/NACK bit.

21. The method of claim 20, further comprising:
determining whether to terminate or continue each of the data transmissions on the at least two carriers based on the ACK/NACK bits.

22. An apparatus for wireless communication, comprising:
means for sending data transmissions to a user equipment (UE) on a plurality of carriers configured for use by the UE;
means for receiving from the UE acknowledgement/negative acknowledgement (ACK/NACK) information comprising at least two bundled ACK/NACK bits relating to data transmissions on at least two carriers of the plurality of carriers, the at least two carriers selected based on a total number of the ACK/NACK bits for the data transmissions on the plurality of carriers;
means for determining a plurality of ACK/NACK transmission techniques comprising at least a cross-carrier bundling technique in which ACK/NACK bits corresponding to data transmissions on a subset of two or more carriers in the plurality of carriers are bundled and a bundling technique that is not associated with the cross-carrier bundling technique; and
means for obtaining ACK/NACK bits for the data transmissions on the at least two carriers based on the at least two bundled ACK/NACK bits, wherein at least one bit of the bundled ACK/NACK bits is bundled according to the cross-carrier bundling technique and at least one other bit of the bundled ACK/NACK bits is bundled according to the bundling technique that is not associated with the cross-carrier bundling technique.

23. The apparatus of claim 22, further comprising:
means for determining whether to terminate or continue each of the data transmissions on the at least two carriers based on the ACK/NACK bits.

24. A method for wireless communication, comprising:
receiving data transmissions on a plurality of carriers configured for use by a user equipment (UE);
determining, at the UE, acknowledgement/negative acknowledgement (ACK/NACK) bits for the data transmissions on the plurality of carriers;
determining a plurality of ACK/NACK transmission techniques available to the UE in a multi-carrier operation, the plurality of ACK/NACK transmission techniques comprising at least a cross-carrier bundling technique in which ACK/NACK bits corresponding to data transmissions on a subset of two or more carriers in the plurality of carriers are bundled and
a technique that is not associated with the cross-carrier bundling technique, wherein the technique that is not associated with the cross-carrier bundling technique is selected based on a total number of the ACK/NACK bits for the data transmissions on the plurality of carriers or a number of carriers on which data transmissions are received;
bundling ACK/NACK bits corresponding to the data transmissions on the at least two carriers of the subset with the cross-carrier bundling technique;
bundling ACK/NACK bits corresponding to the data transmissions on another subset of carriers with the bundling technique that is not associated with the cross-carrier bundling technique; and
sending the bundled ACK/NACK bits for the data transmissions.

25. The method of claim 24, wherein the determining the plurality of ACK/NACK transmission techniques available to the UE in a multi-carrier operation comprises:
selecting an orthogonal sequence reduction technique when a total number of ACK/NACK bits for the data transmissions on the plurality of carriers is greater than a predetermined value or when the number of carriers on which data transmissions are received is greater than a predetermined threshold.

26. The method of claim 24, wherein the determining the plurality of ACK/NACK transmission techniques available to the UE in a multi-carrier operation comprises:
selecting a spatial bundling technique when a total number of ACK/NACK bits for the data transmissions on the plurality of carriers is greater than a predetermined value or when the number of carriers on which data transmissions are received is greater than a predetermined threshold.

27. The method of claim 24, wherein the determining the plurality of ACK/NACK transmission techniques available to the UE in a multi-carrier operation comprises:
selecting a channel selection technique when a total number of ACK/NACK bits for the data transmissions on the plurality of carriers is greater than a predetermined value of when the number of carriers on which data transmissions are received is greater than a predetermined threshold.

28. The method of claim 24, wherein the bundled ACK/NACK bits are bundled based on an order of prioritization of the plurality of ACK/NACK transmission techniques.

29. The method of claim 24, wherein the plurality of ACK/NACK transmission techniques includes an orthogonal sequence reduction technique for sending ACK/NACK bits using an orthogonal sequence of a shorter length than a nominal length.

30. The method of claim 24, wherein the plurality of ACK/NACK transmission techniques includes a spatial bundling technique for bundling ACK/NACK bits for multiple data transmissions sent concurrently on a carrier with spatial multiplexing.

31. The method of claim 24, wherein the plurality of ACK/NACK transmission techniques includes a channel selection technique for sending ACK/NACK information using one of multiple resources.

32. The method of claim 24, wherein the plurality of ACK/NACK transmission techniques includes a carrier bundling technique for bundling ACK/NACK bits for multiple packets sent on multiple carriers in a subframe.

33. The method of claim 24, wherein the plurality of ACK/NACK transmission techniques includes a subframe bundling technique for bundling ACK/NACK bits for multiple packets sent on a carrier in multiple subframes.

34. An apparatus for wireless communication, comprising:
means for receiving data transmissions on a plurality of carriers configured for use by a user equipment (UE);
means for determining, at the UE, acknowledgement/negative acknowledgement (ACK/NACK) bits for the data transmissions on the plurality of carriers;
means for determining a plurality of ACK/NACK transmission techniques available to the UE in a multi-carrier operation, the plurality of ACK/NACK transmission techniques comprising at least a cross-carrier bundling technique in which ACK/NACK bits corresponding to data transmissions on a subset of two or more carriers in the plurality of carriers are bundled and
at least one ACK/NACK transmission technique that is not associated with the cross-carrier bundling technique, wherein the at least one ACK/NACK transmission technique that is not associated with the cross-carrier bundling technique is selected based on a total number of the ACK/NACK bits for the data transmissions on the plurality of carriers or a number of carriers on which data transmissions are received;
means for bundling ACK/NACK bits corresponding to the data transmissions on the at least two carriers of the subset with the cross-carrier bundling technique;
means for bundling ACK/NACK bits corresponding to the data transmissions on another subset of carriers with the bundling technique that is not associated with the cross-carrier bundling technique; and
means for sending the ACK/NACK bits for the data transmissions on the plurality of carriers based on the at least one ACK/NACK transmission technique.

35. The apparatus of claim 34, wherein the at least one ACK/NACK transmission technique is selected further based on an order or prioritization of the plurality of ACK/NACK transmission techniques.

36. The apparatus of claim 34, wherein the at least one ACK/NACK transmission technique further includes a subframe bundling technique, or a combination of the subframe bundling technique, an orthogonal sequence reduction technique, a spatial bundling technique, a channel selection technique, or the cross-carrier bundling technique.

37. An apparatus for wireless communication, comprising:
at least one processor configured to:
receive data transmissions on a plurality of carriers configured for use by a user equipment (UE),
determine acknowledgement/negative acknowledgement (ACK/NACK) bits for the data transmissions on the plurality of carriers,
determine a plurality of ACK/NACK transmission techniques available to the UE in a multi-carrier operation, the plurality of ACK/NACK transmission techniques comprising at least a cross-carrier bundling technique in which ACK/NACK bits corresponding to data transmissions on a subset of two or more carriers in the plurality of carriers are bundled and
at least one ACK/NACK transmission technique that is not associated with the cross-carrier bundling technique, wherein the at least one ACK/NACK transmission technique that is not associated with the cross-carrier bundling technique is selected based on a total number of the ACK/NACK bits for the data transmissions on the plurality of carriers or a number of carriers on which data transmissions are received,
bundle ACK/NACK bits corresponding to the data transmissions on the at least two carriers of the subset with the cross-carrier bundling technique,
bundle ACK/NACK bits corresponding to the data transmissions on another subset of carriers with the bundling technique that is not associated with the cross-carrier bundling technique, and
send the bundled ACK/NACK bits for the data transmissions on the plurality of carriers; and
a memory coupled to the at least one processor.

38. The apparatus of claim 37, wherein the at least one ACK/NACK transmission technique is selected further based on an order of prioritization of the plurality of ACK/NACK transmission techniques.

39. The apparatus of claim 37, wherein the at least one ACK/NACK transmission technique includes an orthogonal sequence reduction technique, a spatial bundling technique, a channel selection technique, a carrier bundling technique, a subframe bundling technique, or a combination thereof.

40. A non-transitory computer-readable medium storing computer executable code, comprising code for:
receiving data transmissions on a plurality of carriers configured for use by a user equipment (UE),
determining acknowledgement/negative acknowledgement (ACK/NACK) bits for the data transmissions on the plurality of carriers,
determining a plurality of ACK/NACK transmission techniques available to the UE in a multi-carrier operation, the plurality of ACK/NACK transmission techniques comprising at least a cross-carrier bundling technique in which ACK/NACK bits corresponding to data transmissions on a subset of two or more carriers in the plurality of carriers are bundled and
a technique that is not associated with the cross-carrier bundling technique, wherein the technique that is not associated with the cross-carrier bundling technique is selected based on a total number of the ACK/NACK bits for the data transmissions on the plurality of carriers or a number of carriers on which data transmissions are received,
bundling ACK/NACK bits corresponding to the data transmissions on the at least two carriers of the subset with the cross-carrier bundling technique,
bundling ACK/NACK bits corresponding to the data transmissions on another subset of carriers with the bundling technique that is not associated with the cross-carrier bundling technique, and
sending the bundled ACK/NACK bits for the data transmissions on the plurality of carriers.

41. A method for wireless communication, comprising:
sending data transmissions to a user equipment (UE) on a plurality of carriers configured for use by the UE;
receiving, from the UE, ACK/NACK information corresponding to the data transmissions on the plurality of carriers;
determining a plurality of ACK/NACK transmission techniques available to the UE in a multi-carrier operation, the plurality of ACK/NACK transmission techniques comprising at least a cross-carrier bundling technique in which ACK/NACK bits corresponding to data transmissions on a subset of two or more carriers in the plurality of carriers are bundled and
a technique that is not associated with the cross-carrier bundling technique, wherein the technique that is not associated with the cross-carrier bundling technique is selected based on a total number of the ACK/NACK bits for the data transmissions on the plurality of carriers or a number of carriers on which data transmissions are received; and
recovering ACK/NACK bits for the data transmissions on the plurality of carriers based on the ACK/NACK information, wherein the ACK/NACK bits corresponding to the data transmissions on the subset of the two or more carriers were bundled based on the cross-carrier bundling technique and the ACK/NACK bits corresponding to the data transmission on another subset of carriers were bundled based on the bundling technique that is not associated with the cross-carrier bundling technique.

42. The method of claim 41, further comprising:
determining whether to terminate or continue each of the data transmissions on the plurality of carriers based on the ACK/NACK bits.

43. An apparatus for wireless communication, comprising:

means for sending data transmissions to a user equipment (UE) on a plurality of carriers configured for use by the UE;

means for receiving, from the UE, ACK/NACK information corresponding to the data transmissions on the plurality of carriers;

means for determining a plurality of ACK/NACK transmission techniques available to the UE in a multi-carrier operation, the plurality of ACK/NACK transmission techniques comprising at least a cross-carrier bundling technique in which ACK/NACK bits corresponding to data transmissions on a subset of two or more carriers in the plurality of carriers are bundled and a technique that is not associated with the cross-carrier bundling technique, wherein the technique that is not associated with the cross-carrier bundling technique is selected based on a total number of the ACK/NACK bits for the data transmissions on the plurality of carriers or a number of carriers on which data transmissions are received; and means for recovering ACK/NACK bits for the data transmissions on the plurality of carriers based on the ACK/NACK information, wherein the ACK/NACK bits corresponding to the data transmissions on the subset of the two or more carriers were bundled based on the cross-carrier bundling technique and the ACK/NACK bits corresponding to the data transmission on another subset of carriers were bundled based on the bundling technique that is not associated with the cross-carrier bundling technique.

44. The apparatus of claim 43, further comprising:

means for determining whether to terminate or continue each of the data transmissions on the plurality of carriers based on the ACK/NACK bits.

* * * * *